US009941712B2

(12) United States Patent
Kaita et al.

(10) Patent No.: US 9,941,712 B2
(45) Date of Patent: Apr. 10, 2018

(54) ELECTRICAL STORAGE SYSTEM

(71) Applicants: Keiji Kaita, Miyoshi (JP); Yuji Nishi, Nagoya (JP); Yukinari Tanabe, Nagoya (JP); Hiromasa Tanaka, Okazaki (JP); Motoi Ito, Nagoya (JP)

(72) Inventors: Keiji Kaita, Miyoshi (JP); Yuji Nishi, Nagoya (JP); Yukinari Tanabe, Nagoya (JP); Hiromasa Tanaka, Okazaki (JP); Motoi Ito, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 143 days.

(21) Appl. No.: 14/424,250

(22) PCT Filed: Nov. 28, 2013

(86) PCT No.: PCT/IB2013/002662
§ 371 (c)(1),
(2) Date: Feb. 26, 2015

(87) PCT Pub. No.: WO2014/087213
PCT Pub. Date: Jun. 12, 2014

(65) Prior Publication Data
US 2015/0229143 A1 Aug. 13, 2015

(30) Foreign Application Priority Data
Dec. 3, 2012 (JP) .................................. 2012-264008

(51) Int. Cl.
*H02J 7/00* (2006.01)
*H02J 7/14* (2006.01)
(Continued)

(52) U.S. Cl.
CPC .......... *H02J 7/0021* (2013.01); *B60L 3/0046* (2013.01); *B60L 3/0053* (2013.01); *B60L 3/04* (2013.01);
(Continued)

(58) Field of Classification Search
USPC ........ 320/118, 134, 109, 128, 136, 162, 163
See application file for complete search history.

(56) References Cited

U.S. PATENT DOCUMENTS 5,321,389 A * 6/1994 Meister ................... H02J 9/002
307/10.7
5,804,944 A 9/1998 Alberkrack et al.
(Continued)

FOREIGN PATENT DOCUMENTS

CN 101008094 A 8/2007
CN 101197507 A 6/2008
(Continued)

OTHER PUBLICATIONS

Communication dated Jun. 19, 2017, issued by the U.S. Patent and Trademark Office in U.S. Appl. No. 14/649,014.
(Continued)

*Primary Examiner* — Alexis Pacheco
(74) *Attorney, Agent, or Firm* — Sughrue Mion, PLLC

(57) ABSTRACT

An electrical storage system includes a relay switching between an on state where an electrical storage device (10) is connected to a load and an off state where connection of the electrical storage device with the load is interrupted; a controller controlling an on-off state of the relay; and a current interruption circuit (60) interrupting energization of the electrical storage device. The current interruption circuit includes an alarm circuit (63) outputting an alarm signal indicating that any one electrical storage block is in an overcharged state by comparing a voltage value of each
(Continued)

electrical storage block with a threshold; a latch circuit (64) retaining the alarm signal; a transistor (66) causing the relay to switch from the on state to the off state upon reception of an output signal of the latch circuit; and a power supply circuit (63*d*) generating electric power for operating the latch circuit using electric power of the electrical storage device.

7 Claims, 11 Drawing Sheets

(51) Int. Cl.
*H02H 7/18* (2006.01)
*B60L 11/18* (2006.01)
*B60L 3/00* (2006.01)
*B60L 3/04* (2006.01)
*B60L 3/12* (2006.01)
*B60L 7/14* (2006.01)
*B60K 28/00* (2006.01)

(52) U.S. Cl.
CPC ........ *B60L 3/12* (2013.01); *B60L 7/14* (2013.01); *B60L 11/1803* (2013.01); *B60L 11/1859* (2013.01); *B60L 11/1861* (2013.01); *B60L 11/1864* (2013.01); *B60L 11/1887* (2013.01); *H02H 7/18* (2013.01); *H02J 7/0031* (2013.01); *B60K 2028/006* (2013.01); *B60L 2240/545* (2013.01); *B60L 2240/547* (2013.01); *B60L 2240/549* (2013.01); *B60L 2250/10* (2013.01); *B60L 2270/20* (2013.01); *H02J 7/0016* (2013.01); *H02J 2007/0037* (2013.01); *Y02T 10/7044* (2013.01); *Y02T 10/7055* (2013.01); *Y02T 10/7061* (2013.01); *Y02T 90/34* (2013.01)

(56) References Cited

U.S. PATENT DOCUMENTS

| | | | |
|---|---|---|---|
| 5,986,865 A | 11/1999 | Umeki et al. | |
| 8,248,030 B2 | 8/2012 | Doepke et al. | |
| 8,924,059 B2 | 12/2014 | Yoshikawa et al. | |
| 9,577,458 B2 | 2/2017 | Kaita et al. | |
| 2006/0103351 A1* | 5/2006 | Tanigawa | H02J 7/0016 320/118 |
| 2010/0001651 A1 | 1/2010 | Lin | |
| 2010/0082198 A1 | 4/2010 | Arai et al. | |
| 2010/0123434 A1* | 5/2010 | Iwata | H02J 7/0016 320/118 |
| 2011/0140669 A1* | 6/2011 | Murakami | B60L 3/0038 320/134 |
| 2011/0149454 A1 | 6/2011 | Shibuya et al. | |
| 2012/0038325 A1 | 2/2012 | Morita | |
| 2012/0069481 A1 | 3/2012 | Yamada | |
| 2013/0116875 A1 | 5/2013 | Oh et al. | |
| 2013/0141828 A1 | 6/2013 | Yamaguchi et al. | |
| 2013/0241480 A1 | 9/2013 | Kirimoto et al. | |
| 2013/0335095 A1 | 12/2013 | Kiuchi | |
| 2014/0015454 A1 | 1/2014 | Kunimitsu | |
| 2015/0229143 A1 | 8/2015 | Kaita et al. | |
| 2015/0229154 A1 | 8/2015 | Kaita et al. | |
| 2015/0255979 A1* | 9/2015 | Kaita | H02H 7/18 361/90 |
| 2015/0357856 A1 | 12/2015 | Tanabe et al. | |

FOREIGN PATENT DOCUMENTS

| | | | |
|---|---|---|---|
| CN | 101620829 A | 1/2010 | |
| CN | 102012475 A | 4/2011 | |
| CN | 102436281 A | 5/2012 | |
| EP | 1 533 881 A2 | 5/2005 | |
| JP | 1-127983 A | 5/1989 | |
| JP | 5-133986 A | 5/1993 | |
| JP | 07105986 A | 4/1995 | |
| JP | 9-331629 A | 12/1997 | |
| JP | 10-012282 A | 1/1998 | |
| JP | 11-155237 A | 6/1999 | |
| JP | 11-215716 A | 8/1999 | |
| JP | 2000-166108 A | 6/2000 | |
| JP | 2000312439 A | 11/2000 | |
| JP | 2001136666 A | 5/2001 | |
| JP | 2001-524300 A | 11/2001 | |
| JP | 2003-346916 A | 12/2003 | |
| JP | 2005-245049 A | 9/2005 | |
| JP | 3780977 B2 | 5/2006 | |
| JP | 2008-199761 A | 8/2008 | |
| JP | 2008-312396 A | 12/2008 | |
| JP | 2009-178014 A | 8/2009 | |
| JP | 2009219215 A | 9/2009 | |
| JP | 2010-110156 A | 5/2010 | |
| JP | 2011-076778 A | 4/2011 | |
| JP | 2012-050258 A | 3/2012 | |
| JP | 2012-065447 A | 3/2012 | |
| KR | 10-1998-0046978 A | 9/1998 | |
| KR | 20-1999-0032282 U | 7/1999 | |
| KR | 10-2002-0087190 A | 11/2002 | |
| KR | 2003-0039579 A | 5/2003 | |
| KR | 20-0439685 Y1 | 4/2008 | |
| KR | 10-2012-0024738 A | 3/2012 | |
| TW | 411646 B | 11/2000 | |
| WO | 98/45924 A2 | 10/1998 | |
| WO | 2012/005554 A2 | 1/2012 | |
| WO | 2012132178 A1 | 10/2012 | |
| WO | 2012132220 A1 | 10/2012 | |

OTHER PUBLICATIONS

Communication dated Feb. 27, 2017 issued by the U.S. Patent and Trademark Office in counterpart U.S. Appl. No. 14/649,014.
Office Action dated Sep. 14, 2017 from U.S. Patent & Trademark Office in counterpart U.S. Appl. No. 14/431,601.

\* cited by examiner

ELECTRICAL STORAGE SYSTEM

BACKGROUND OF THE INVENTION

1. Field of the Invention

The invention relates to a technique for interrupting energization of an electrical storage device irrespective of control executed by a controller.

2. Description of Related Art

Japanese Patent Application Publication No. 2008-199761 (JP 2008-199761 A) describes that a system main relay is turned off when charging current flows through a secondary battery in order to prevent overcharging of the secondary battery. By turning off the system main relay, it is possible to interrupt connection of the secondary battery with a load, it is possible to stop charging the secondary battery, and it is possible to prevent overcharging of the secondary battery.

In JP 2008-199761 A, a central processing unit (CPU) included in an electronic control unit (ECU) controls an on-off state of the system main relay. The CPU executes not only drive control over the system main relay but also other control, and sometimes changes a program incorporated in the CPU. Here, when the program is changed, it is necessary to check whether drive control over the system main relay, in other words, control for preventing overcharging, is normally executed after the program is changed.

SUMMARY OF THE INVENTION

A first aspect of the invention provides an electrical storage system. The electrical storage system includes an electrical storage device, a relay, a controller and a current interruption circuit. The electrical storage device includes a plurality of electrical storage blocks configured to be charged or discharged. These electrical storage blocks are connected in series with each other. The relay is configured to switch between an on state where the electrical storage device is connected to a load and an off state where connection of the electrical storage device with the load is interrupted. The controller is configured to control an on-off state of the relay. The current interruption circuit is configured to interrupt energization of the electrical storage device by causing the relay to switch from the on state to the off state.

The current interruption circuit includes an alarm circuit, a latch circuit, a transistor and a power supply circuit. The alarm circuit is configured to output an alarm signal indicating that any one of the electrical storage blocks is in an overcharged state by comparing a voltage value of each of the electrical storage blocks with a threshold. The latch circuit is configured to retain the alarm signal and output the retained signal. The transistor is configured to cause the relay to switch from the on state to the off state upon reception of an output signal of the latch circuit. The power supply circuit is configured to generate electric power for operating the latch circuit by using electric power of the electrical storage device.

Each electrical storage block may be formed of a single electrical storage element or may be formed of a plurality of electrical storage elements. When each electrical storage block is formed of a plurality of electrical storage elements, the plurality of electrical storage elements may be connected in series with each other or connected in parallel with each other.

According to the first aspect of the invention, the controller is able to cause the relay to switch between the on state and the off state by outputting a control signal. In addition, it is possible to cause the relay to switch from the on state to the off state with the use of the current interruption circuit through a line different from a line through which the controller controls the relay.

That is, the current interruption circuit is able to cause the relay to switch from the on state to the off state independently of control executed by the controller. Therefore, even when a program (microcomputer) included in the controller is changed, it is possible to cause the relay to switch from the on state to the off state with the use of the current interruption circuit when any one of the electrical storage blocks is in an overcharged state. In this way, irrespective of the controller, it is possible to continuously use the current interruption circuit, and it is possible to improve the general versatility of the current interruption circuit.

The operation of the current interruption circuit does not include program processing, so it is possible to cause the relay to switch from the on state to the off state without taking a bug of a program into consideration. Electrical elements included in the current interruption circuit may be formed of semiconductor elements of which abrasion degradation (aged degradation) is hard to advance, so it is possible to improve the reliability of the component.

Because the current interruption circuit includes the latch circuit, when the alarm signal is output from the alarm circuit, it is possible to continuously output the alarm signal from the latch circuit, so it is possible to cause the relay to remain in the off state. When the relay is caused to switch from the on state to the off state with the use of the current interruption circuit, the voltage value of each electrical storage block decreases with an elimination of the polarization of the electrical storage device (electrical storage blocks). When the voltage value of each electrical storage block decreases, the alarm signal may not be output from the alarm circuit. Specifically, the alarm signal may not be output from the alarm circuit when the voltage value of each electrical storage block becomes lower than the threshold.

When the alarm signal stops being output, the voltage value of each electrical storage block increases as a result of energization of the electrical storage device, and the alarm signal may be output from the alarm circuit again. Here, when the latch circuit is omitted, the alarm signal is output or not output from the alarm circuit. Accordingly, the relay may repeatedly switch between the on state and the off state, and abrasion degradation of the relay is advanced.

According to the first aspect of the invention, after the alarm signal is output from the alarm circuit, the alarm signal is retained by the latch circuit. Accordingly, it is possible to prevent a situation that the alarm signal is output or not output, and it is possible to prevent the relay from repeatedly switching between the on state and the off state. Thus, it is possible to suppress advance of abrasion degradation of the relay.

In addition, according to the first aspect of the invention, the latch circuit is operated upon reception of electric power supplied from the power supply circuit. In other words, the latch circuit operates using electric power of the electrical storage device. Here, the voltage value of each electrical storage block is input to the alarm circuit, so it is possible to simplify a line through which electric power is supplied to the latch circuit by supplying electric power of the electrical storage device to the latch circuit as well. Specifically, in comparison with the case where electric power is supplied from the power supply, different from the electrical storage device, to the latch circuit, it is possible to shorten the line through which electric power is supplied.

The electrical storage system may further include a plug that is operated by a user. The plug may be configured to be movable between a first position in which energization of the electrical storage device is allowed and a second position in which energization of the electrical storage device is interrupted. Here, a line, through which electric power of the power supply circuit is supplied to the latch circuit, may be interrupted in response to movement of the plug to the second position. That is, it is possible to interrupt supply of electric power from the power supply circuit to the latch circuit.

When the electrical storage system is, for example, checked, it is required to set the electrical storage device in a non-energized state. Therefore, a worker who conducts checking, or the like (the user of the plug) moves the plug from the first position to the second position. In addition, after the alarm signal is output, it is desirable to cancel the alarm signal retained by the latch circuit at the time of for example, checking the electrical storage system. Therefore, as the plug is moved to the second position, the retained alarm signal may be cancelled by interrupting supply of electric power from the power supply circuit to the latch circuit. That is, only by operating the plug, it is possible to not only set the electrical storage device in the non-energized state but also cancel the retained alarm signal.

The alarm circuit may include first comparators and a second comparator. When a positive electrode terminal and negative electrode terminal of each electrical storage block are respectively connected to input terminals of a corresponding one of the first comparators, a potential difference between a positive electrode and negative electrode of each electrical storage block, in other words, a voltage value of each electrical storage block, may be detected. In addition, an output of each first comparator may be input to one of input terminals of the second comparator, and a threshold (voltage value) used to determine an overcharged state may be input to the other one of the input terminals of the second comparator.

Here, the threshold (voltage value) may be generated by dividing the voltage value of the power supply circuit with the use of two resistors. When the second comparator is used, it may be determined whether any one of the electrical storage blocks is in the overcharged state by comparing the voltage value of each electrical storage block with the threshold (voltage value). When the voltage value of any one of the electrical storage blocks is higher than the threshold (voltage value), the second comparator (alarm circuit) may output the alarm signal. On the other hand, when the voltage value of each electrical storage block is lower than the threshold (voltage value), the second comparator (alarm circuit) does not output any alarm signal.

A second aspect of the invention provides an electrical storage system. The electrical storage system, as well as the first aspect of the invention, includes an electrical storage device, a relay, a controller and a current interruption circuit. Here, the current interruption circuit includes an alarm circuit, a latch circuit, a photocoupler and a transistor. The alarm circuit is configured to output an alarm signal by comparing a voltage value of each electrical storage block with a threshold, and the latch circuit is configured to retain the alarm signal. The photocoupler is configured to generate an input signal of the latch circuit upon reception of an output signal of the alarm circuit. The transistor is configured to cause the relay to switch from the on state to the off state upon reception of an output signal of the latch circuit.

Here, the photocoupler and the transistor are configured to operate upon reception of electric power supplied from a power supply. In addition, the latch circuit is configured to operate upon reception of electric power supplied from the power supply of the photocoupler and transistor. In the second aspect of the invention, the latch circuit is provided on an output side of the photocoupler, so electric power is also easily supplied to the latch circuit with the use of the power supply configured to supply electric power to the photocoupler.

Electric power of the electrical storage device may be supplied to the latch circuit. However, in this case, for example, a photocoupler is provided in a line through which electric power of the electrical storage device is supplied to the latch circuit, and it is required to convert high voltage to low voltage. In the second aspect of the invention, electric power from the same power supply just needs to be supplied to the photocoupler and the latch circuit, and it is not required to additionally provide an electrical component, such as a photocoupler.

According to the second aspect of the invention as well, the latch circuit is used, so, as in the case of the first aspect of the invention, it is possible to prevent the relay from repeatedly switching between the on state and the off state. Accordingly, it is possible to suppress advance of abrasion degradation of the relay.

The electrical storage device may be mounted on a vehicle. Here, when electric energy output from the electrical storage device is converted to kinetic energy, the vehicle may be caused to travel using the kinetic energy. Supply of electric power from the power supply may be interrupted in response to switching of an ignition switch of the vehicle from an on state to an off state. In the second aspect of the invention, the latch circuit operates upon reception of electric power supplied from the power supply, so the alarm signal retained by the latch circuit may be cancelled by interrupting the supply of electric power. In other words, the retained alarm signal may be cancelled in response to switching of the ignition switch into the off state.

When the retained alarm signal is cancelled in this way, it is possible to allow connection of the electrical storage device to the load again when the ignition switch switches from the off state to the on state. That is, it is possible to resume charging or discharging the electrical storage device, so it is possible to cause the vehicle to travel using discharging electric power of the electrical storage device. Thus, even after the alarm signal is output, it is possible to cause the vehicle to travel in order to cause the vehicle to retreat to a predetermined place.

The controller may be configured to determine that the current interruption circuit is in an operated state when a drive command for the relay does not coincide with an operating state of the relay. Here, when the electrical storage device is connected to the load, the electrical storage device is allowed be charged or discharged, and a voltage value and a current value based on the charging or discharging operation of the electrical storage device are obtained. In addition, when connection of the electrical storage device with the load is interrupted, the electrical storage device is not charged or discharged, so the voltage value and the current value based on a stop of the charging or discharging operation are obtained.

The controller may be configured to determine a connection state between the electrical storage device and the load by investigating the voltage value and current value of the electrical storage device. In other words, the controller may be configured to determine the operating state of the relay. Here, the voltage value of the electrical storage device may be detected with the use of a voltage sensor, and the current value of the electrical storage device may be detected with the use of a current sensor.

Each time it is determined that the current interruption circuit is in the operated state, the number of times the current interruption circuit is operated may be counted. When the number of times the current interruption circuit is operated is larger than a predetermined number of times, the controller may be configured not to connect the electrical storage device to the load. As described above, if connection between the electrical storage device and the load is continuously allowed in response to the on state of the ignition switch, an inconvenience described below may occur.

For example, when the electrical storage device is connected to the load in response to the on state of the ignition switch, the alarm signal may be output from the alarm circuit again. In this case, the relay switches from the on state to the off state, and connection of the electrical storage device with the load is interrupted. In this way, if connection between the electrical storage device and the load and interruption of the connection are repeated, a user experiences a feeling of strangeness.

In addition, the number of times the relay switches between the on state and the off state increases, so abrasion degradation of the relay may be advanced. Furthermore, by continuously allowing the electrical storage device to be charged or discharged in a situation that any one of the electrical storage blocks is in the overcharged state, degradation of the electrical storage device is easily advanced.

Therefore, when the number of times the current interruption circuit is operated is larger than the predetermined number of times, it is possible to avoid the above-described inconvenience by not connecting the electrical storage device to the load.

A third aspect of the invention provides an electrical storage system. The electrical storage system, as well as the first and second aspects of the invention, includes an electrical storage device, a relay, a controller and a current interruption circuit. Here, the current interruption circuit includes an alarm circuit, a power supply circuit and a transistor. The alarm circuit is configured to output an alarm signal by comparing a voltage value of each electrical storage block with a threshold, and the transistor is configured to cause the relay to switch from an on state to an off state upon reception of an output signal of the alarm circuit. The power supply circuit is configured to generate electric power for operating the alarm circuit by using electric power of the electrical storage device.

The alarm circuit includes a comparator (so-called hysteresis comparator) having a hysteresis characteristic. Here, a hysteresis is larger than a voltage drop of each electrical storage block after energization of the electrical storage device is interrupted.

According to the third aspect of the invention, with the use of the comparator included in the alarm circuit, it is possible to output the alarm signal by comparing the voltage value of each electrical storage block with the threshold. Here, the threshold may be set using a voltage value of the power supply circuit. Specifically, it is possible to set the threshold by dividing the voltage value of the power supply circuit with the use of two resistor. The voltage value of each electrical storage block is input to the alarm circuit, so, when the threshold is set, the voltage value of the power supply circuit (in other words, the voltage value of the electrical storage device) is easily utilized.

The comparator has a hysteresis characteristic, so, after the alarm signal is output from the comparator, it is possible to decrease the threshold by the amount of the hysteresis. Thus, after energization of the electrical storage device is interrupted, even when the voltage value of each electrical storage block decreases with elimination of polarization of the electrical storage device, the voltage value of each electrical storage block is hard to become lower than the threshold.

If the voltage value of each electrical storage block does not become lower than the threshold, the alarm circuit is allowed to continuously output the alarm signal. Thus, as in the case of the first aspect of the invention, it is possible to suppress repeated switching of the relay between the on state and the off state, so it is possible to suppress advance of abrasion degradation of the relay.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described.

Figure 1:
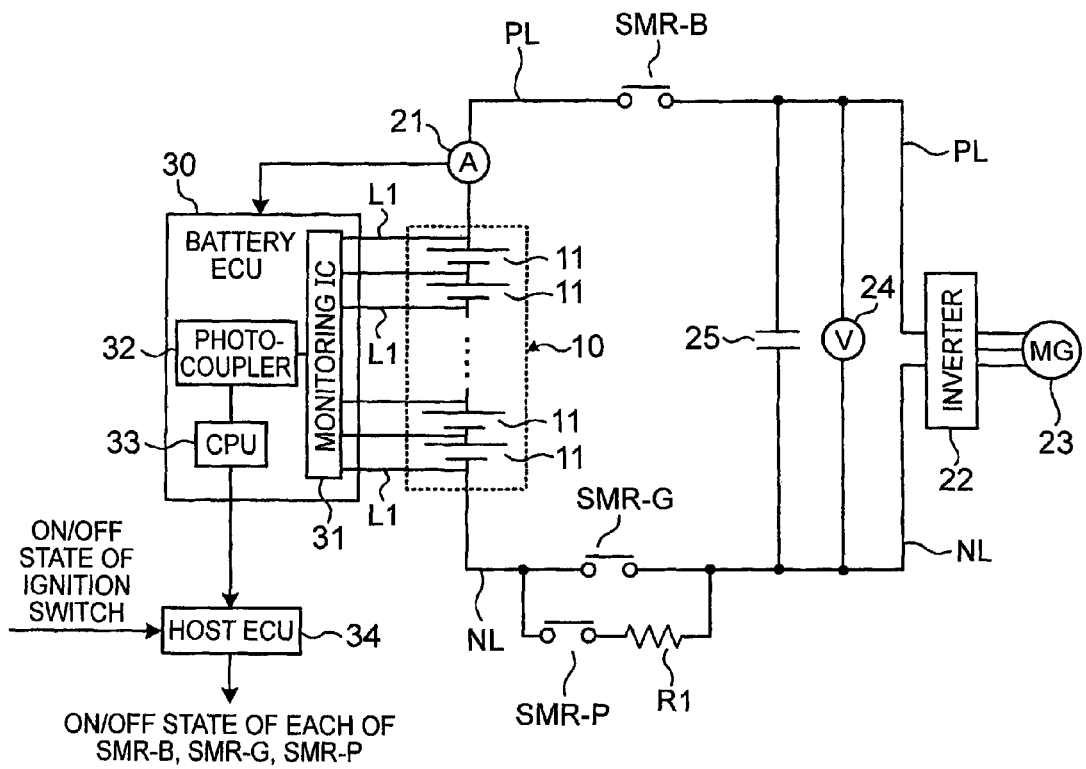
FIG. 1 is a view that shows the configuration of a battery system.

FIG. 1 is a view that shows the configuration of a battery system (which corresponds to an electrical storage system according to the invention) according to a first embodiment. The battery system shown in FIG. 1 may be, for example, mounted on a vehicle. The vehicle is allowed to travel using an output of a battery pack 10. The invention may be applied to a device other than the vehicle.

The battery pack 10 includes a plurality of single cells (so-called electrical storage elements) 11 that are electrically connected in series with one another. Each single cell 11 may be a secondary battery, such as a nickel metal hydride battery and a lithium ion battery. Instead of the secondary battery, an electric double layer capacitor may be used. The number of the single cells 11 may be set as needed on the basis of a required output, or the like, of the battery pack 10. In the present embodiment, all the single cells 11 that constitute the battery pack 10 are electrically connected in series with one another; instead, the battery pack 10 may include a plurality of the single cells 11 that are electrically connected in parallel with each other.

A current sensor 21 detects a current flowing through the battery pack 10, and outputs the detected result to a battery electronic control unit (ECU) 30. The battery ECU 30 outputs information about the current value detected by the current sensor 21 to a host electronic control unit (ECU) 34.

In the present embodiment, the current sensor 21 is provided in a positive electrode line PL connected to a positive electrode terminal of the battery pack 10. The current sensor 21 just needs to be able to detect a current flowing through the battery pack 10. The location at which the current sensor 21 is provided may be set as needed. Specifically, the current sensor 21 may be provided in the positive electrode line PL or in a negative electrode line NL connected to a negative electrode terminal of the battery pack 10. A plurality of the current sensors 21 may be used.

A system main relay SMR-B is provided in the positive electrode line PL. The system main relay SMR-B switches between an on state and an off state upon reception of a control signal from the host ECU 34. Here, the battery ECU 30 and the host ECU 34 correspond to a controller according to the invention.

Figure 2:
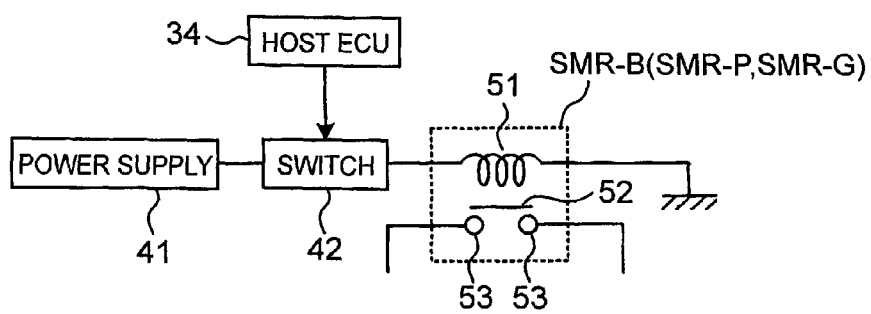
FIG. 2 is a view that shows the structure of each system main relay.

As shown in FIG. 2, the system main relay SMR-B includes an exciting coil 51, a movable contact 52 and fixed contacts 53. One end of the exciting coil 51 is connected to a power supply 41 via a switch 42, and the other end of the exciting coil 51 is grounded. For example, an auxiliary battery mounted on the vehicle may be used as the power supply 41. The auxiliary battery supplies electric power to electric components mounted on the vehicle.

The switch 42 switches between an on state and an off state upon reception of a control signal from the host ECU 34. When the switch 42 switches from the off state to the on state, current flows from the power supply 41 to the exciting coil 51, and magnetic force is generated at the exciting coil 51. On the other hand, when the switch 42 switches from the on state to the off state, energization of the exciting coil 51 from the power supply 41 is interrupted.

The movable contact 52 is, for example, urged by a spring, or the like, in a direction away from the fixed contacts 53. When current flows through the exciting coil 51, the movable contact 52 moves against the urging force due to the magnetic force generated at the exciting coil 51. Thus, the movable contact 52 contacts the fixed contacts 53, and the system main relay SMR-B switches from the off state to the on state. On the other hand, when energization of the exciting coil 51 is interrupted, the movable contact 52 moves away from the fixed contacts 53 upon reception of the urging force. Thus, the system main relay SMR-B switches from the on state to the off state.

In FIG. 1, a system main relay SMR-G is provided in the negative electrode line NL. The system main relay SMR-G switches between an on state and an off state upon reception of a control signal from the host ECU 34. The structure of the system main relay SMR-G is similar to the structure of the system main relay SMR-B (see FIG. 2).

A system main relay SMR-P and a current limiting resistor R1 are electrically connected in parallel with the system main relay SMR-G. The system main relay SMR-P and the current limiting resistor R1 are electrically connected in series with each other. The system main relay SMR-P switches between an on state and an off state upon reception of a control signal from the host ECU 34.

The structure of the system main relay SMR-P is similar to that of the system main relay SMR-B (see FIG. 2). The current limiting resistor R1 is used to inhibit inrush current from flowing to a capacitor 25 when the battery pack 10 is connected to a load (specifically, an inverter 22 (described later)). The capacitor 25 is connected to the positive electrode line PL and the negative electrode line NL, and is used to suppress voltage fluctuations between the positive electrode line PL and the negative electrode line NL.

A voltage sensor 24 is connected between the positive electrode line PL and the negative electrode line NL. Specifically, the voltage sensor 24 is connected to the positive electrode line PL that connects the system main relay SMR-B to the inverter 22 and the negative electrode line NL that connects the system main relay SMR-G to the inverter 22. The voltage sensor 24 detects a voltage value input to the inverter 22, that is, a voltage value of the capacitor 25, and outputs the detected result to the battery ECU 30. The battery ECU 30 outputs the detected result of the voltage sensor 24 to the host ECU 34.

The battery pack 10 is connected to the inverter 22 via the positive electrode line PL and the negative electrode line NL. When the battery pack 10 is connected to the inverter 22, the host ECU 34 initially causes the system main relay SMR-B to switch from the off state to the on state, and causes the system main relay SMR-P to switch from the off state to the on state. Thus, it is possible to cause discharging current of the battery pack 10 to flow to the capacitor 25 via the current limiting resistor R1 and to charge the capacitor 25.

Subsequently, the host ECU 34 switches the system main relay SMR-G from the off state to the on state, and switches the system main relay SMR-P from the on state to the off state. Thus, connection of the battery pack 10 with the inverter 22 is completed, and the battery system shown in FIG. 1 enters a start-up state (ready-on state). Information about the on-off state of an ignition switch of the vehicle is input to the host ECU 34. When the ignition switch switches from the off state to the on state, the host ECU 34 starts up the battery system shown in FIG. 1.

On the other hand, when the ignition switch switches from the on state to the off state, the host ECU 34 causes the system main relays SMR-B, SMR-G to switch from the on state to the off state. Thus, electrical connection of the battery pack 10 with the inverter 22 is interrupted, and the battery system shown in FIG. 1 enters a stopped state (ready-off state). When the battery system is in the stopped state, the battery pack 10 is not charged or discharged.

The inverter 22 converts direct-current power, output from the battery pack 10, to alternating-current power, and outputs the alternating-current power to a motor generator (MG) 23. The motor generator 23 generates kinetic energy for propelling the vehicle upon reception of the alternating-current power output from the inverter 22. The kinetic energy generated by the motor generator 23 is transmitted to wheels, and is able to propel the vehicle.

When the vehicle is decelerated or stopped, the motor generator 23 converts kinetic energy, generated at the time of braking the vehicle, to electric energy (alternating-current power). The inverter 22 converts the alternating-current power, generated by the motor generator 23, to direct-current power, and outputs the direct-current power to the battery pack 10. Thus, the battery pack 10 is able to store regenerated electric power.

The battery ECU 30 includes a monitoring integrated circuit (IC) 31. The monitoring IC 31 is connected to the single cells 11 via voltage detection lines L1, and detects the voltage value of each of the single cells 11. Here, any two of the voltage detection lines L1 are connected to a positive electrode terminal and a negative electrode terminal of a corresponding one of the single cells 11. The monitoring IC 31 is also able to detect the voltage value of the battery pack 10 with the use of the voltage detection lines L1.

In the present embodiment, the monitoring IC 31 detects the voltage value of each single cell (which corresponds to an electrical storage block according to the invention) 11; however, the invention is not limited to this configuration. For example, the monitoring IC 31 is able to detect the voltage value of a battery block (which corresponds to the electrical storage block according to the invention) that includes a plurality of the single cells 11. Here, any two of the voltage detection lines L1 are connected to a positive electrode terminal and a negative electrode terminal of a corresponding one of the battery blocks.

Each battery block may be, for example, formed of a plurality of the single cells 11 electrically connected in series with each other. In addition, each battery block may be, for example, formed of a plurality of the single cells 11 electrically connected in parallel with each other. The battery pack 10 may be formed by electrically connecting the plurality of battery blocks in series with one another.

The battery ECU 30 includes a photocoupler 32 and a central processing unit (CPU) 33. An output of the monitoring IC 31 is input to the CPU 33 via the photocoupler 32. Here, by using the photocoupler 32, it is possible to set a circuit located at the input side of the photocoupler 32 and a circuit located at the output side of the photocoupler 32 in an electrically insulated state. The CPU 33 is able to acquire the voltage value of each single cell 11 on the basis of the output of the monitoring IC 31.

The battery ECU 30 (CPU 33) outputs the acquired voltage value of each single cell 11 (or the battery pack 10) to the host ECU 34. The host ECU 34 acquires the voltage value of each single cell 11 from the battery ECU 30. Thus, the host ECU 34 is able to control the charging or discharging operation of the battery pack 10 on the basis of the acquired voltage value. The process of controlling the charging or discharging operation of the battery pack 10 will be described later.

In the present embodiment, the battery pack 10 is connected to the inverter 22; however, the invention is not limited to this configuration. Specifically, a step-up circuit may be provided in a current path that connects the battery pack 10 to the inverter 22. The step-up circuit is able to step up the output voltage of the battery pack 10 and output the stepped-up electric power to the inverter 22. The step-up circuit is also able to step down the output voltage of the inverter 22 and output the stepped-down electric power to the battery pack 10.

Figure 3:
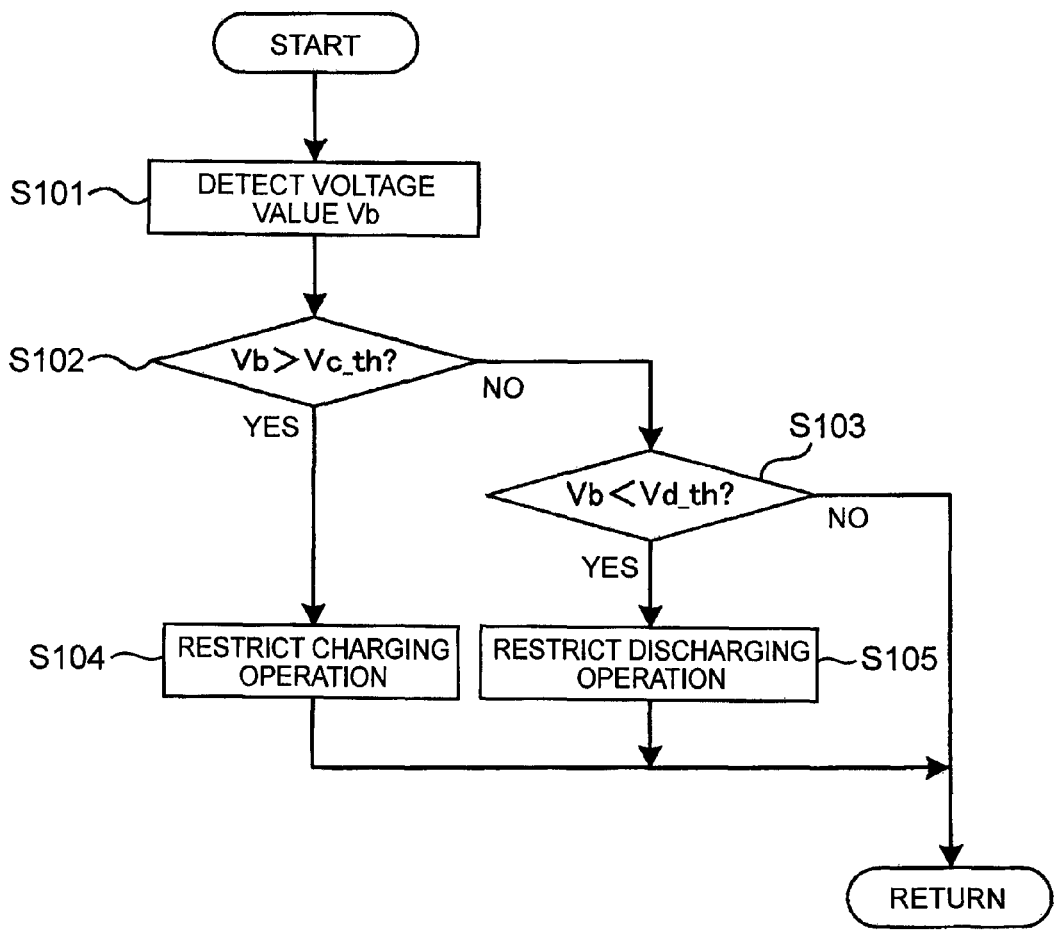
FIG. 3 is a flowchart that shows the process of controlling the charging or discharging operation of a battery pack on the basis of a voltage value of each single cell.

Next, the process of controlling the charging or discharging operation of the battery pack 10 on the basis of the voltage value of each single cell 11 will be described with reference to the flowchart shown in FIG. 3. Here, the process shown in FIG. 3 is executed by the host ECU 34. Specifically, the host ECU 34 executes the process shown in FIG. 3 on the basis of a computer program embedded in the host ECU 34. In addition, the process shown in FIG. 3 is repeatedly executed at predetermined intervals.

In step S101, the host ECU 34 acquires a voltage value Vb of each single cell 11. Here, the battery ECU 30 detects the voltage value Vb of each single cell 11 with the use of the monitoring IC 31, and outputs the detected result to the host ECU 34.

In step S102, the host ECU 34 determines whether the voltage value Vb is higher than an upper limit voltage value Vc_th. The upper limit voltage value Vc_th is a predetermined voltage value in order to prevent overcharging of each single cell 11. That is, when the voltage value Vb is higher than the upper limit voltage value Vc_th, the host ECU 34 is allowed to determine that the corresponding single cell 11 is in an overcharged state. In addition, when the voltage value Vb is lower than or equal to the upper limit voltage value Vc_th, the host ECU 34 is allowed to determine that the corresponding single cell 11 is not in the overcharged state.

Determination as to whether the single cell 11 is in the overcharged state is desirably carried out before the single cell 11 actually reaches the overcharged state. Therefore, the upper limit voltage value Vc_th may be set to a value lower than the voltage value of the single cell 11, at which the single cell 11 actually becomes the overcharged state. Information about the upper limit voltage value Vc_th may be stored in a memory.

In the present embodiment, the voltage values of the plurality of single cells 11 are detected, and the overcharged state of any one of the single cells 11 is prevented. There may occur variations in self-discharge characteristics or variations in internal resistance among the plurality of single cells 11, and, due to the variations, there may occur variations in voltage value among the plurality of single cells 11. Therefore, when it is determined whether the single cell 11 is in the overcharged state, it is desirable to compare the highest voltage value Vb with the upper limit voltage value Vc_th.

When the voltage value Vb is higher than the upper limit voltage value Vc_th, the host ECU 34 executes the process of step S104. On the other hand, when the voltage value Vb is lower than or equal to the upper limit voltage value Vc_th, the host ECU 34 executes the process of step S103.

In step S103, the host ECU 34 determines whether the voltage value Vb is lower than a lower limit voltage value Vd_th. The lower limit voltage value Vd_th is a predetermined voltage value in order to prevent overdischarging of each single cell 11. That is, when the voltage value Vb is lower than the lower limit voltage value Vd_th, the host ECU 34 is allowed to determine that the corresponding single cell 11 is in an overdischarged state. In addition, when the voltage value Vb is higher than or equal to the lower limit voltage value Vd_th, the host ECU 34 is allowed to determine that the corresponding single cell 11 is not in the overdischarged state.

Determination as to whether the single cell 11 is in the overdischarged state is desirably carried out before the single cell 11 actually reaches the overdischarged state. Therefore, the lower limit voltage value Vd_th may be set to a value lower than the voltage value of the single cell 11, at which the single cell 11 actually becomes the overdischarged state. Information about the lower limit voltage value Vd_th may be stored in the memory.

In the present embodiment, the voltage values of the plurality of single cells 11 are detected, and the overdischarged state of any one of the single cells 11 is prevented. As described above, there may occur variations in voltage value among the plurality of single cells 11 due to variations in self-discharge characteristics or variations in internal resistance. Therefore, when it is determined whether the single cell 11 is in the overdischarged state, it is desirable to compare the lowest voltage value Vb with the lower limit voltage value Vd_th.

When the voltage value Vb is lower than the lower limit voltage value Vd_th, the host ECU 34 executes the process of step S105. On the other hand, when the voltage value Vb is higher than or equal to the lower limit voltage value Vd_th, the host ECU 34 ends the process shown in FIG. 3.

In step S104, the host ECU 34 restricts the charging operation of the battery pack 10. Specifically, the host ECU 34 is able to restrict the charging operation of the battery pack 10 by decreasing an upper limit electric power Win at or below which the charging operation of the battery pack 10 is allowed. Here, the host ECU 34 controls the charging operation of the battery pack 10 such that the input electric power (charging electric power) of the battery pack 10 does not exceed the upper limit electric power Win.

The upper limit electric power Win may be preset on the basis of the temperature and state of charge (SOC) of the battery pack 10. Here, the SOC indicates the percentage of a current charge capacity with respect to a full charge capacity. Specifically, the upper limit electric power Win is decreased as the temperature of the battery pack 10 increases or the upper limit electric power Win is decreased as the temperature of the battery pack 10 decreases. In addition, the upper limit electric power Win is decreased as the SOC of the battery pack 10 increases. In the process of step S104, the upper limit electric power Win is decreased below a preset value on the basis of the temperature and SOC of the battery pack 10.

In step S105, the host ECU 34 restricts the discharging operation of the battery pack 10. Specifically, the host ECU 34 is able to restrict the discharging operation of the battery pack 10 by decreasing an upper limit electric power Wout at or below which the discharging operation of the battery pack 10 is allowed. Here, the host ECU 34 controls the discharging operation of the battery pack 10 such that the output electric power (discharging electric power) of the battery pack 10 does not exceed the upper limit electric power Wout.

The upper limit electric power Wout may be preset on the basis of the temperature and state of charge (SOC) of the battery pack 10. Specifically, the upper limit electric power Wout is decreased as the temperature of the battery pack 10 increases or the upper limit electric power Wout is decreased as the temperature of the battery pack 10 decreases. In addition, the upper limit electric power Wout is decreased as the SOC of the battery pack 10 decreases.

In the process of step S105, the upper limit electric power Wout is decreased below a preset value on the basis of the temperature and SOC of the battery pack 10. Restricting the discharging operation of the battery pack 10 includes stopping the discharging operation of the battery pack 10. Here, when the upper limit electric power Wout is set to 0 [kW], it is possible to stop the discharging operation of the battery pack 10.

In the process shown in FIG. 3, the charging or discharging operation of the battery pack 10 is controlled on the basis of the voltage value Vb of each single cell 11; however, the invention is not limited to this configuration. For example, it is applicable that the SOC of the battery pack 10 is calculated and then the charging or discharging operation of the battery pack 10 is controlled on the basis of the calculated SOC. For example, when the vehicle is caused to travel with the use of the battery pack 10 and a power source (such as an engine and a fuel cell) other than the battery pack 10, it is possible to control the charging or discharging operation of the battery pack 10 such that the SOC of the battery pack 10 varies along a reference SOC.

Here, the SOC of the battery pack 10 may be calculated using the voltage value Vb of each single cell 11 and a current value flowing through each single cell 11. There have been suggested various methods of calculating the SOC in the existing art, and these suggestions may be employed as needed. Therefore, the detailed description of the method of calculating the SOC is omitted.

Figure 4:
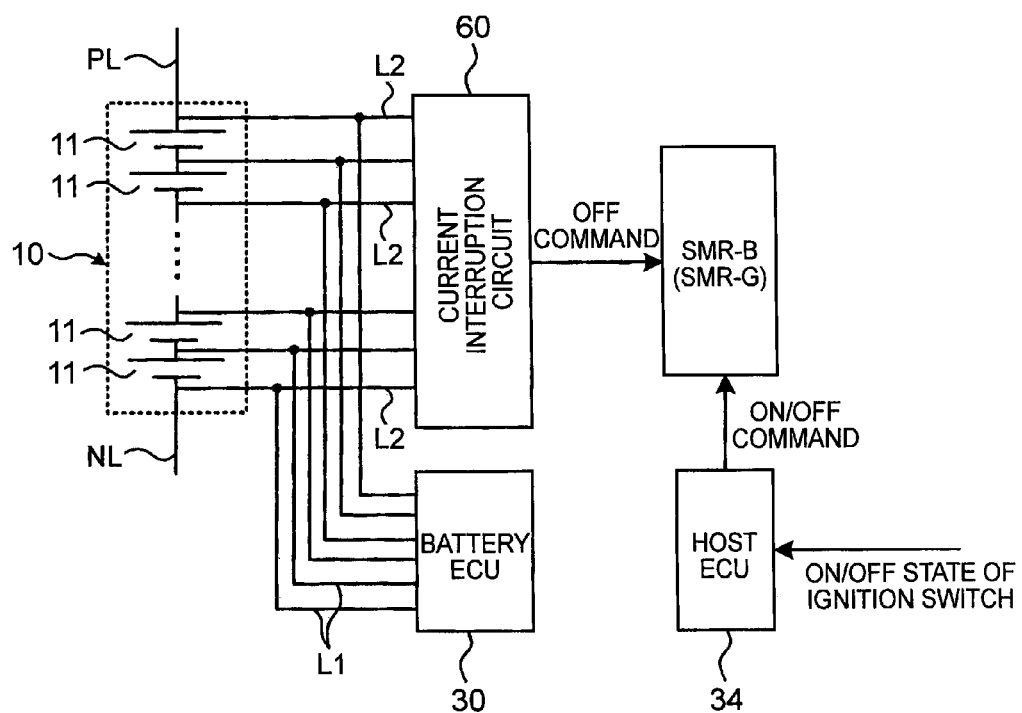
FIG. 4 is a view that shows the configuration of part of a battery system.

As shown in FIG. 4, a current interruption circuit 60 is connected to the battery pack 10 via voltage detection lines L2. Here, each voltage detection line L2 branches off from the corresponding voltage detection line L1, and the number of the voltage detection lines L2 provided is equal to the number of the voltage detection lines L1.

Any two of the plurality of voltage detection lines L2 are connected to the positive electrode terminal and negative electrode terminal of a corresponding one of the single cells 11. The current interruption circuit 60 is able to detect the voltage value of each single cell 11. As described above, when any two of the plurality of voltage detection lines L2 are connected to the positive electrode terminal and negative electrode terminal of a corresponding one of battery blocks, the current interruption circuit 60 is able to detect the voltage value of each battery block with the use of the plurality of voltage detection lines L2.

The current interruption circuit 60 interrupts connection of the battery pack 10 with the inverter 22 when any one of the single cells 11 is in the overcharged state. Specifically, when any one of the single cells 11 is in the overcharged state, the current interruption circuit 60 causes the system main relays SMR-B, SMR-G, SMR-P to switch from the on state to the off state. Here, in the battery system placed in the start-up state (ready-on state), it is just required to be able to interrupt connection of the battery pack 10 with the inverter 22, so the current interruption circuit 60 just needs to cause at least one of the system main relays SMR-B, SMR-G to switch from the on state to the off state.

Specifically, when the voltage value of any one of the single cells 11 is higher than the voltage value corresponding to the overcharged state, the current interruption circuit 60 is able to cause the system main relays SMR-B, SMR-G, SMR-P to switch from the on state to the off state by interrupting energization of the exciting coils 51.

In the present embodiment, the system main relays SMR-B, SMR-G, SMR-P switch between the on state and the off state upon reception of commands from the host ECU 34 or switch between the on state and the off state upon reception of commands from the current interruption circuit 60. That is, a command line for causing the system main relays SMR-B, SMR-G to switch between the on state and the off state includes a command line via the host ECU 34 and a command line via the current interruption circuit 60.

These command lines are independent of each other as shown in FIG. 4. That is, the current interruption circuit 60 is able to cause the system main relays SMR-B, SMR-G, SMR-P to switch from the on state to the off state irrespective of control executed by the host ECU 34. Here, when the current interruption circuit 60 causes the system main relays SMR-B, SMR-G, SMR-P to remain in the off state, the host ECU 34 cannot cause the system main relays SMR-B, SMR-G, SMR-P to switch from the off state to the on state.

Next, the configuration of the current interruption circuit 60 will be described with reference to FIG. 5.

The current interruption circuit 60 includes a protection circuit 61. The protection circuit 61 is connected to the battery pack 10 (single cells 11) via the voltage detection lines L2. The current interruption circuit 60 includes a connector 60a. A connector 10a is provided at one ends of the voltage detection lines L2 connected to the single cells 11. Here, by connecting the connectors 10a, 60a to each other, the current interruption circuit 60 is connected to the battery pack 10.

The protection circuit 61 is used in order to prevent application of overvoltage from the battery pack 10 (single cells 11) to the current interruption circuit 60 (particularly, overcharging detection circuit 63 (described later)). The protection circuit 61 includes resistors R2 and Zener diodes D. The resistor R2 is provided in each voltage detection line L2. When overvoltage is about to be applied to the current interruption circuit 60, application of overvoltage to the current interruption circuit 60 is prevented through melting of the corresponding resistor R2.

Each Zener diode D is electrically connected in parallel with a corresponding one of the single cells 11 via the corresponding two of the voltage detection lines L2. Here, the cathode of each Zener diode D is connected to the positive electrode terminal of the corresponding single cell 11, and the anode of each Zener diode D is connected to the negative electrode terminal of the corresponding single cell 11. The plurality of Zener diodes D are electrically serially connected to one another.

The Zener diodes D are used in order to prevent application of overvoltage from the battery pack 10 (the single cells 11) to the current interruption circuit 60. That is, when overvoltage is about to be applied to the current interruption circuit 60, the corresponding Zener diode D enters a conductive state and is able to flow current from the cathode side to the anode side. Thus, it is possible to prevent application of overvoltage to the overcharging detection circuit 63 (described later) side.

When the Zener diode D enters the conductive state, the Zener diode D causes current to flow through the corresponding resistors R2 and is able to melt the resistors R2. That is, when overvoltage is applied from the battery pack 10 to the current interruption circuit 60, it is possible to interrupt connection of the battery pack 10 with the current interruption circuit 60 through melting of the resistors R2. Thus, it is possible to protect the current interruption circuit 60. If application of overvoltage to the current interruption circuit 60 is excluded, the protection circuit 61 may be omitted.

The current interruption circuit 60 includes a filter circuit 62. The filter circuit 62 is connected to the protection circuit 61 via the voltage detection lines L2, and includes a plurality of capacitors C. Each capacitor C is electrically connected in parallel with the corresponding single cell 11 via the corresponding two of the voltage detection lines L2, and is used to reduce noise in the corresponding two of the voltage detection lines L2. If the influence of noise is ignored, the filter circuit 62 (capacitors C) may be omitted.

The current interruption circuit 60 includes the overcharging detection circuit 63. The overcharging detection circuit 63 is connected to the filter circuit 62 via the voltage detection lines L2, and detects the overcharged state of each single cell 11. When any one of the single cells 11 is in the overcharged state, the overcharging detection circuit 63 outputs an alarm signal. The alarm signal is a signal that indicates that any one of the single cells 11 is in the overcharged state.

The overcharging detection circuit 63 includes comparators 63a. The voltage detection line L2 connected to the positive electrode terminal of each single cell 11 is connected to a negative input terminal of the corresponding comparator 63a. In addition, the voltage detection line L2 connected to the negative electrode terminal of each single cell 11 is connected to a positive input terminal of the corresponding comparator 63a. Here, as shown in FIG. 5, the voltage detection line L2 connected to the positive electrode terminal of one of the adjacent two single cells 11 and the negative electrode terminal of the other one of the adjacent two single cells 11 is branched off. The branched voltage detection lines L2 are respectively connected to the positive input terminal of one of the adjacent two comparators 63a and the negative input terminal of the other one of the adjacent two comparators 63a.

Each comparator 63a outputs a potential difference between the positive electrode and negative electrode of the corresponding single cell 11, in other words, the voltage value of the corresponding single cell 11. The overcharging detection circuit 63 includes an OR circuit 63b, and an output signal of each comparator 63a is input to the OR circuit 63b. The OR circuit 63b is connected to the plurality of comparators 63a. When the output signal of any one of the comparators 63a is input to the OR circuit 63b, the OR circuit 63b generates an output signal.

In the present embodiment, the plurality of comparators 63a operate at mutually different timings. That is, the output signals of the plurality of comparators 63a are input to the OR circuit 63b at mutually different timings. Therefore, each time the voltage value of each single cell 11 is detected, the OR circuit 63b outputs a signal corresponding to the voltage value.

The overcharging detection circuit 63 includes an alarm setting circuit 63c connected to the OR circuit 63b. The output signal of the OR circuit 63b is input to the alarm setting circuit 63c. The alarm setting circuit 63c determines whether any one of the single cells 11 is in the overcharged state, and outputs the alarm signal when any one of the single cells 11 is in the overcharged state.

Figure 6:
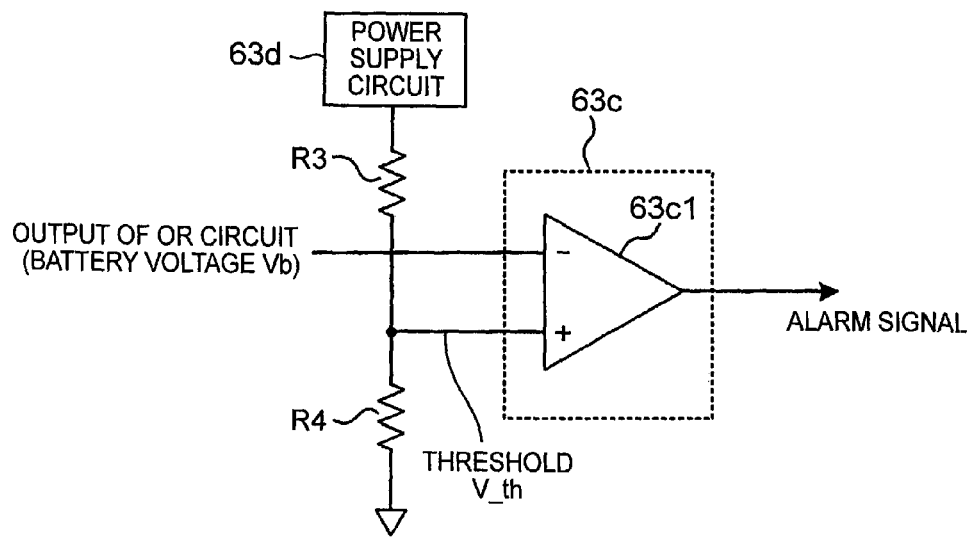
FIG. 6 is a view that shows the configuration of an alarm setting circuit according to the first embodiment.

Specifically, as shown in FIG. 6, the alarm setting circuit 63c is formed of a comparator 63c1. The output signal of the OR circuit 63b (the voltage value Vb of any one of the single cells 11) is input to a negative input terminal of the comparator 63c1. In addition, a threshold (voltage value) V_th is input to a positive input terminal of the comparator 63c1. The threshold V_th is generated by dividing the voltage value, generated by a power supply circuit 63d, with the use of the resistors R3, R4.

The power supply circuit 63d is included in the overcharging detection circuit 63. The power supply circuit 63d steps down the voltage value of the battery pack 10 (the single cells 11), and outputs the stepped-down voltage (constant voltage). Here, the power supply circuit 63d is connected to the battery pack 10 (single cells 11) via the voltage detection lines L2. The power supply circuit 63d may be supplied with electric power of the battery pack 10 or may be supplied with electric power of part of the single cells 11 (a plurality of the serially connected single cells 11) among all the single cells 11 that constitute the battery pack 10.

The resistors R3, R4 are electrically connected in series with the power supply circuit 63d. A connection point between the resistors R3, R4 is connected to the positive input terminal of the comparator 63c1. The threshold V_th is preset as will be described later, so the output voltage of the power supply circuit 63d and the resistance values of the resistors R3, R4 may be set such that the threshold V_th becomes a set value.

Here, the threshold (voltage value) V_th is a voltage value for determining whether any one of the single cells 11 is in the overcharged state, and may be set as needed in consideration of, for example, the charging and discharging characteristics of each single cell 11. For example, the threshold (voltage value) V_th may be set to a voltage value at which each single cell 11 actually becomes the overcharged state or may be set to a value lower than the voltage value at which each single cell 11 actually becomes the overcharged state. Here, the threshold (voltage value) V_th may be set to a value higher than the upper limit voltage value Vc_th described in the process of step S102 shown in FIG. 3.

When the output signal of the OR circuit 63b (the voltage value Vb of any one of the single cells 11) is higher than the threshold (voltage value) V_th, the output signal (alarm signal) of the comparator 63c1 is generated. On the other hand, when the output signal of the OR circuit 63b (the voltage value Vb of each single cell 11) is lower than or equal to the threshold (voltage value) V_th, no output signal (alarm signal) of the comparator 63c1 is generated.

Figure 7:
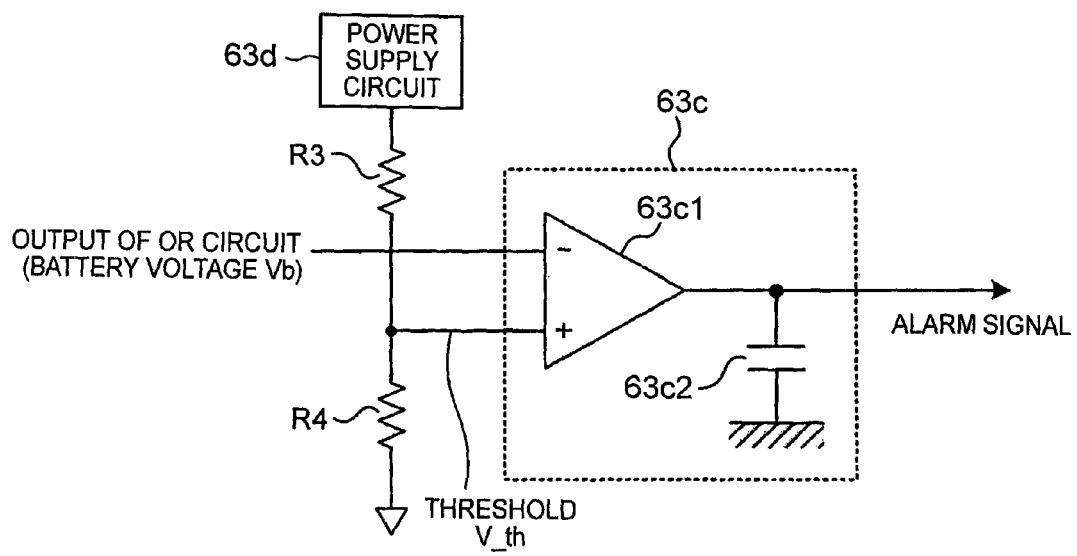
FIG. 7 is a view that shows another configuration of the alarm setting circuit according to the first embodiment.

On the other hand, the configuration shown in FIG. 7 may be used as the alarm setting circuit 63c. In FIG. 7, one end of a capacitor 63c2 is connected to an output line of the comparator 63c1. In addition, the other end of the capacitor 63c2 is grounded. By providing the capacitor 63c2, it is possible to suppress inclusion of noise in the output signal of the alarm setting circuit 63c (comparator 63c1). That is, by removing noise with the use of the capacitor 63c2, it is possible to improve the reliability of the output signal (alarm signal) of the alarm setting circuit 63c.

Figure 5:
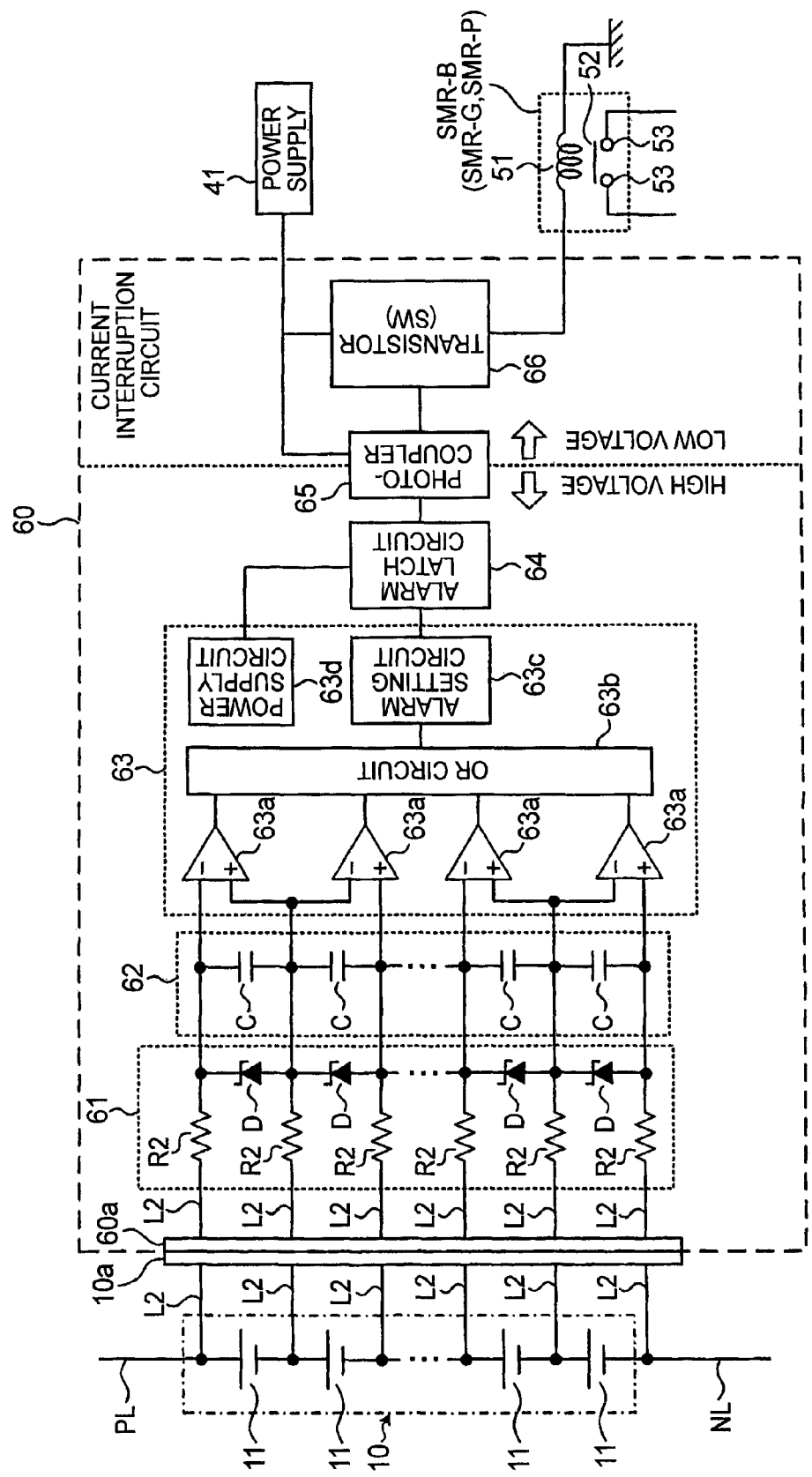
FIG. 5 is a view that shows the configuration of a current interruption circuit according to a first embodiment.

In FIG. 5, an alarm latch circuit 64 is connected to the overcharging detection circuit 63 (alarm setting circuit 63c), and the alarm signal output from the alarm setting circuit 63c is input to the alarm latch circuit 64. The alarm latch circuit 64 retains an input signal (alarm signal) from the alarm setting circuit 63c, and outputs a latched signal (corresponding to the alarm signal). The alarm latch circuit 64 operates upon reception of electric power from the power supply circuit 63d included in the overcharging detection circuit 63.

According to the present embodiment, the voltage of the power supply circuit 63d included in the overcharging detection circuit 63 is supplied to the alarm latch circuit 64, so it is not required to individually provide a line through which electric power is supplied to the alarm latch circuit 64. Here, the overcharging detection circuit 63 and the alarm latch circuit 64 may be arranged at mutually adjacent locations, so it is possible to shorten a power supply line that connects the power supply circuit 63d to the alarm latch circuit 64.

Figure 8:
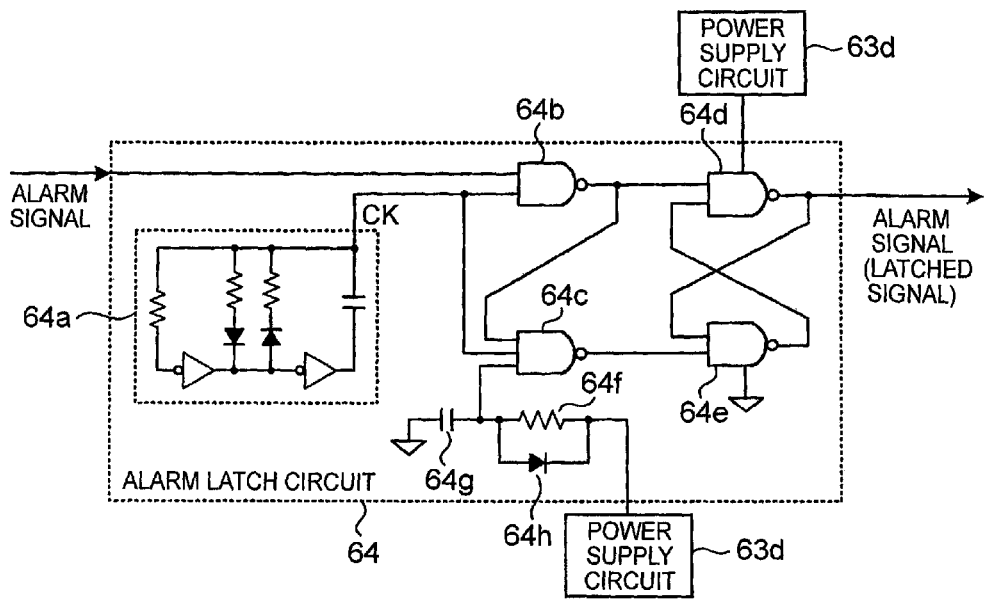
FIG. 8 is a view that shows the configuration of an alarm latch circuit according to the first embodiment.

For example, an RS latch circuit shown in FIG. 8 may be used as the alarm latch circuit 64. In FIG. 8, the alarm latch circuit 64 includes a clock signal generator 64a that outputs a clock signal CK. The clock signal generator 64a is connected to a first input terminal of a NAND gate 64b and a first input terminal of a NAND gate 64c. The clock signal CK is input to the NAND gates 64b, 64c. In the present embodiment, as shown in FIG. 8, the clock signal generator 64a is formed of resistors, a capacitor, diodes and inverters; however, the invention is not limited to this configuration. That is, as long as a clock signal generator is configured to generate the clock signal CK, the clock signal generator may have any configuration.

The alarm setting circuit 63c is connected to a second input terminal of the NAND gate 64b, and the alarm signal output from the alarm setting circuit 63c is input to the NAND gate 64b. An output terminal of the NAND gate 64b is connected to a first input terminal of a NAND gate 64d and a second input terminal of the NAND gate 64c. An output signal of the NAND gate 64b is input to the NAND gates 64c, 64d.

A third input terminal of the NAND gate 64c is connected to the power supply circuit 63d. Here, a resistor 64f and a capacitor 64g are electrically connected in series with the power supply circuit 63d. A diode 64h is electrically connected in parallel with the resistor 64f. Specifically, the anode of the diode 64h is connected to a connection point between the resistor 64f and the capacitor 64g, and the cathode of the diode 64h is connected to a connection line that connects the resistor 64f to the power supply circuit 63d. The third input terminal of the NAND gate 64c is connected to a connection point between the capacitor 64g and the resistor 64f (diode 64h).

An output terminal of the NAND gate 64c is connected to a first input terminal of a NAND gate 64e. An output signal of the NAND gate 64c is input to the NAND gate 64e. An output terminal of the NAND gate 64e is connected to a second input terminal of the NAND gate 64d. An output signal of the NAND gate 64e is input to the NAND gate 64d. The power supply circuit 63d is connected to the NAND gate 64d.

An output signal of the NAND gate 64d is input to the photocoupler 65 (described later) as the alarm signal (latched signal). An output terminal of the NAND gate 64d is connected to a second input terminal of the NAND gate 64e. An output signal of the NAND gate 64d is input to the NAND gate 64e.

With the configuration shown in FIG. 8, when the alarm signal (H level) is input to the NAND gate 64b, the alarm signal (H level) is continuously output from the NAND gate 64d (alarm latch circuit 64). That is, the alarm signal is retained by the alarm latch circuit 64, and the output signal of the alarm latch circuit 64 stops varying.

On the other hand, when supply of electric power from the power supply circuit 63d to the alarm latch circuit 64 is interrupted, the input signal to the NAND gate 64c switches, and the alarm signal is not output from the alarm latch circuit 64. That is, the alarm signal retained by the alarm latch circuit 64 is cancelled, and the output signal of the NAND gate 64d switches from H level to L level.

Because the power supply circuit 63d receives electric power from the battery pack 10 (single cells 11), supply of electric power from the battery pack 10 to the power supply circuit 63d is interrupted if the connectors 10a, 60a are disconnected from each other. Accordingly, supply of electric power from the power supply circuit 63d to the alarm latch circuit 64 is interrupted.

The alarm signal may be retained by the alarm latch circuit 64 in response to the H level of the clock signal CK. In this way, by retaining the alarm signal in synchronization with the clock signal CK, it is possible to retain the alarm signal by excluding the influence of noise included in the input signal of the alarm latch circuit 64. That is, when the alarm signal is retained, it is possible to improve resistance against noise. It is also possible to retain the alarm signal without using the clock signal CK. In this case, it is possible to omit the clock signal generator 64a.

In the configuration shown in FIG. 8, the output signal of the NAND gate 64b is input to the NAND gate 64c. Thus, when a command to set (retention operation) and a command to reset (cancel retention operation) are input to the alarm latch circuit 64 (RS latch circuit) shown in FIG. 8 at the same time due to noise, or the like, it is possible to cause the alarm latch circuit 64 to retain the alarm signal in a set state. That is, it is possible to continuously output the alarm signal from the alarm latch circuit 64.

When the set command and the reset command are input to the alarm latch circuit 64 at the same time, it is more desirable to retain the alarm signal than cancelling the retained alarm signal. That is, it is more desirable not to charge or discharge the battery pack 10 by retaining the alarm signal rather than to allow the battery pack 10 to be charged or discharged by cancelling the retained alarm signal.

The alarm latch circuit 64 is connected to the photocoupler 65. The photocoupler 65 is used as a switch element, and switches from an off state to an on state upon reception of the latched signal (alarm signal) from the alarm latch circuit 64. Here, the photocoupler 65 receives electric power supplied from the power supply 41. The photocoupler 65 is an electrically insulating element, so it is possible to electrically insulate a circuit (high voltage circuit) located at the input side of the photocoupler 65 and a circuit (low voltage circuit) located at the output side of the photocoupler 65 from each other. In other words, the photocoupler 65 is able to convert a high voltage signal as an input signal to a low voltage signal as an output signal.

The photocoupler 65 is connected to a transistor 66. One end of the transistor 66 is connected to the power supply 41. The other end of the transistor 66 is connected to the exciting coils 51 of the system main relays SMR-B, SMR-G, SMR-P. In the present embodiment, the transistor 66 is provided between the power supply 41 and the exciting coils 51; however, the invention is not limited to this configuration. Specifically, the transistor 66 may be provided in a line that grounds the exciting coils 51.

When the photocoupler 65 switches from the off state to the on state, the output signal of the photocoupler 65 is input to the transistor 66, and the transistor 66 switches from the on state to the off state. The transistor 66 corresponds to the switch 42 shown in FIG. 2. Thus, the transistor 66 (switch 42) operates upon reception of a drive command from the host ECU 34 or operates upon reception of the output signal of the photocoupler 65. Here, when the transistor 66 is turned off by the current interruption circuit 60, the transistor 66 does not switch from the off state to the on state even when the transistor 66 receives the drive command from the host ECU 34.

As described with reference to FIG. 2, when the transistor 66 is in the on state, current flows from the power supply 41 to the exciting coils 51, so the system main relays SMR-B, SMR-G, SMR-P turn on. On the other hand, when the transistor 66 is in the off state, supply of current from the power supply 41 to the exciting coils 51 is interrupted, so the system main relays SMR-B, SMR-G, SMR-P turn off.

According to the present embodiment, when the overcharging detection circuit 63 detects the overcharged state of any one of the single cells 11, the output signal (alarm signal) of the overcharging detection circuit 63 is input to the transistor 66. Thus, it is possible to cause the system main relays SMR-B, SMR-G, SMR-P to switch from the on state to the off state. Thus, it is possible to prevent the single cell 11 in the overcharged state from being charged or discharged.

In the present embodiment, the system main relays SMR-B, SMR-G, SMR-P switch between the on state and the off state upon reception of the drive commands from the host ECU 34. On the other hand, when any one of the single cells 11 becomes the overcharged state, not control executed by the host ECU 34 but the current interruption circuit 60 causes the system main relays SMR-B, SMR-G, SMR-P to switch from the on state to the off state. In this way, the drive commands for the system main relays SMR-B, SMR-G, SMR-P are separately issued through a path that includes the host ECU 34 and a path that includes the current interruption circuit 60.

Therefore, even when the design of the host ECU 34 or the design of the battery ECU 30 is changed, the current interruption circuit 60 is not influenced by the design change. In other words, even after the design of the host ECU 34 or the design of the battery ECU 30 is changed, it is allowed to continuously use the current interruption circuit 60. The current interruption circuit 60 is an exclusive component for causing the system main relays SMR-B, SMR-G, SMR-P to turn off at the time of overcharging of any one of the single cells 11, so it is possible to improve general versatility.

As described above, the current interruption circuit 60 is formed of electronic components (mainly, semiconductor elements), and does not execute process using a computer program. Therefore, when the current interruption circuit 60 is used, it is possible to drive the system main relays SMR-B, SMR-G, SMR-P without taking a bug of a program into consideration. In addition, normally, abrasion degradation (aged degradation) is hard to occur in semiconductor elements, so it is possible to improve the reliability of the component (current interruption circuit 60) by forming the current interruption circuit 60 from the semiconductor elements.

In the configuration shown in FIG. 5, the single current interruption circuit 60 is provided in correspondence with the battery pack 10; however, the invention is not limited to this configuration. Specifically, when all the single cells 11 that constitute the battery pack 10 are separated into a plurality of groups, the current interruption circuit 60 may be provided in correspondence with each group. Here, when the current interruption circuit 60 is provided for each group, the circuit located at the output sides of the photocouplers 65 may be shared. That is, the output signal of each photocoupler 65 may be input to the transistor 66.

In the present embodiment, when the current interruption circuit 60 outputs the alarm signal, the system main relays SMR-B, SMR-G, SMR-P are caused to switch from the on state to the off state; however, the invention is not limited to this configuration. That is, when any one of the single cells 11 is in the overcharged state, the battery pack 10 just needs to be not charged or discharged.

Therefore, it is possible to cause only the system main relay SMR-B to turn off in response to the alarm signal output from the current interruption circuit 60 or to cause only at least one of the system main relays SMR-P, SMR-G to turn off in response to the alarm signal. Here, determination as to the overcharged state is carried out when the battery pack 10 is connected to the load (inverter 22), so at least one of the system main relays SMR-B, SMR-G just needs to be caused to turn off in response to the alarm signal.

In the present embodiment, when the alarm signal is output from the alarm setting circuit 63c, the alarm signal is retained in the alarm latch circuit 64. That is, after the alarm signal is output from the alarm setting circuit 63c, the alarm signal is continuously output from the alarm latch circuit 64, and the system main relays SMR-B, SMR-G, SMR-P remain in the off state. If the alarm latch circuit 64 is omitted, the alarm signal is output or not output from the alarm setting circuit 63c on the basis of the voltage value of each single cell 11.

Figure 9:
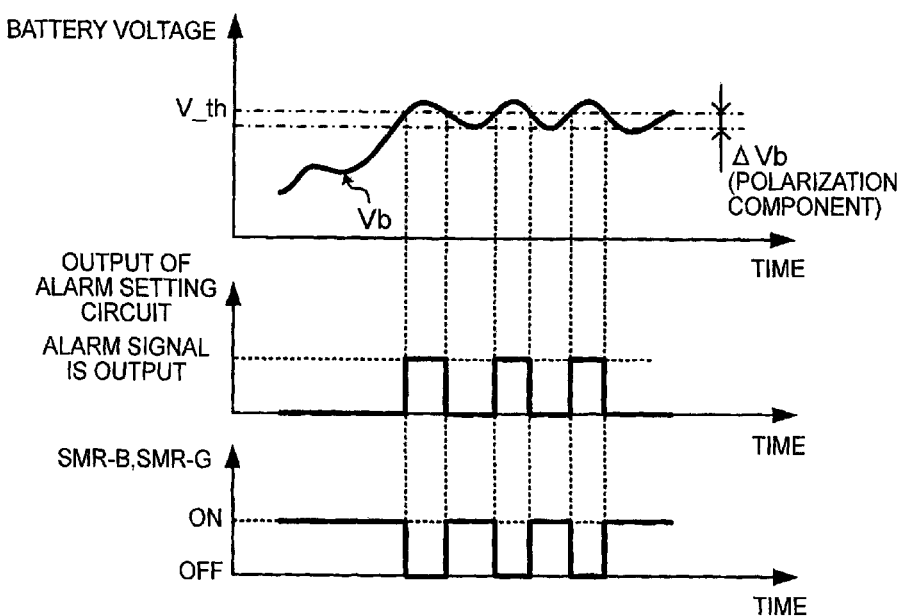
FIG. 9 is a graph that shows an output of the alarm setting circuit and operation of each system main relay in a configuration that no alarm latch circuit is provided.

FIG. 9 is a graph that shows the correlation between the output of the alarm setting circuit 63c and the on-off state of each of the system main relays SMR-B, SMR-G in the configuration from which the alarm latch circuit 64 is omitted.

As shown in FIG. 9, the alarm signal is output from the alarm setting circuit 63c in response to the fact that the voltage value Vb of any one of the single cells 11 reaches the threshold V_th. If the alarm signal is output, the system main relays SMR-B, SMR-G switch from the on state to the off state. Thus, the battery pack 10 (single cells 11) stops being charged or discharged, and polarization of the battery pack 10 (single cells 11) is eliminated.

When the battery pack 10 (single cells 11) is being charged or discharged, polarization occurs in the battery pack 10, and the voltage value of each single cell 11 deviates from an open-circuit voltage by a voltage variation caused by polarization. When the charging or discharging operation of the battery pack 10 (single cells 11) is stopped; polarization of each single cell 11 is eliminated, and the voltage value Vb of each single cell 11 decreases by a voltage variation (voltage drop) ΔVb corresponding to the polarization. When the polarization is eliminated, the voltage value Vb becomes the open-circuit voltage of each single cell 11.

When the voltage value Vb of each single cell 11 decreases with an elimination of the polarization, the voltage value Vb may decrease below the threshold V_th. Particularly, as the voltage variation ΔVb increases, the voltage value Vb after the polarization has been eliminated tends to decrease below the threshold V_th.

The voltage variation ΔVb is expressed by the product of the current value flowing through the single cell 11 and the internal resistance of the single cell 11. Therefore, as the current value (charging current) flowing through the single cell 11 increases, the voltage variation ΔVb increases. In addition, as the internal resistance of the single cell 11 increases, the voltage variation ΔVb increases. Here, as the temperature of the single cell 11 decreases, the internal resistance of the single cell 11 tends to increase.

When the voltage value Vb of any one of the single cells 11 becomes lower than the threshold V_th with an elimination of the polarization; the alarm signal is output from the alarm setting circuit 63c, and the transistor 66 switches from the off state to the on state. Thus, energization of the exciting coils 51 is allowed, and the system main relays SMR-B, SMR-G switch from the off state to the on state.

If the system main relays SMR-B, SMR-G switch from the off state to the on state, the battery pack 10 (single cells 11) resumes being charged or discharged, and the voltage value Vb of any one of the single cells 11 may become higher than the threshold V_th again. If the voltage value Vb becomes higher than the threshold V_th, the system main relays SMR-B, SMR-G are caused to switch from the on state to the off state by the current interruption circuit 60 as described above.

According to the above-described behavior of the voltage value Vb, the system main relays SMR-B, SMR-G repeatedly switch between the on state and the off state. In this way, if the system main relays SMR-B, SMR-G repeatedly switch between the on state and the off state, abrasion degradation of the system main relays SMR-B, SMR-G is advanced.

Figure 10:
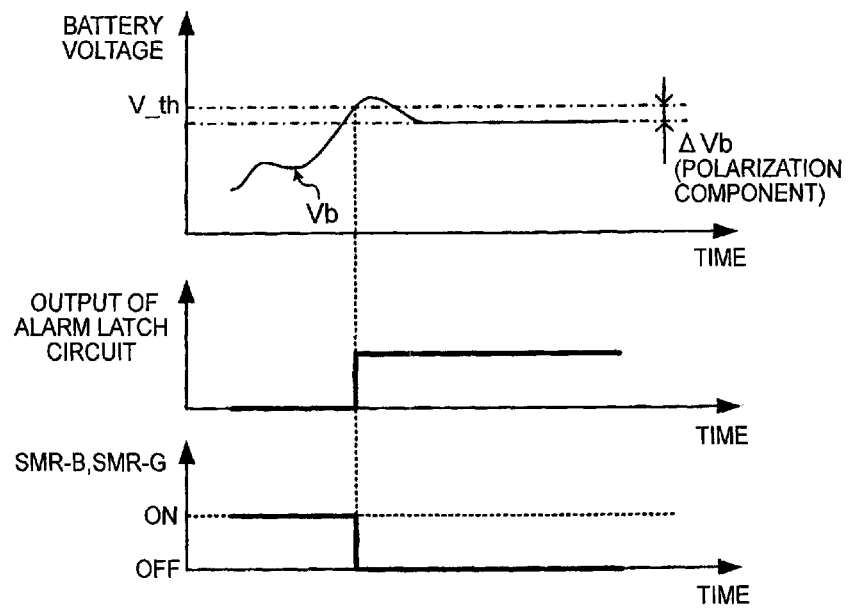
FIG. 10 is a graph that shows an output of the alarm latch circuit and operation of each system main relay in a configuration that the alarm latch circuit is provided.

In the present embodiment, the alarm latch circuit 64 is provided, so, when the alarm signal is output from the alarm setting circuit 63c, the alarm signal is retained by the alarm latch circuit 64 as shown in FIG. 10. When the alarm signal is retained, the system main relays SMR-B, SMR-G remain in the off state.

Thus, it is possible to prevent the system main relays SMR-B, SMR-G from repeatedly switching between the on state and the off state due to the behavior of the voltage value Vb shown in FIG. 9. Thus, it is possible to suppress advance of abrasion degradation of the system main relays SMR-B, SMR-G. Here, the system main relays SMR-B, SMR-G remain in the off state, so the voltage value Vb of each single cell 11 is kept in a state where the voltage value Vb is decreased by the voltage variation ΔVb. In other words, the voltage value Vb of each single cell 11 is kept at the open-circuit voltage.

Next, a battery system according to a second embodiment of the invention will be described. In the present embodiment, like reference numerals denote the same elements as those described in the first embodiment, and the detailed description is omitted. Hereinafter, the difference from the first embodiment will be mainly described.

Figure 11:
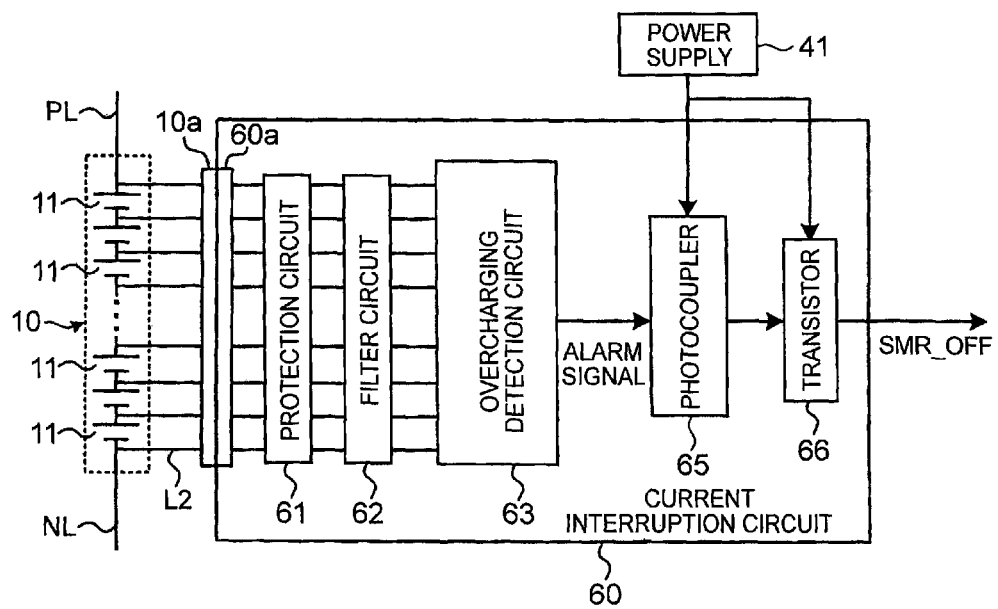
FIG. 11 is a view that shows the configuration of a current interruption circuit according to a second embodiment.

In the first embodiment, the alarm signal is continuously retained with the use of the alarm latch circuit 64; whereas, in the present embodiment, the alarm latch circuit 64 is omitted as shown in FIG. 11. However, in the present embodiment as well, as in the case of the first embodiment, after the alarm signal is output from the overcharging detection circuit 63, the alarm signal is continuously output.

Figure 12:
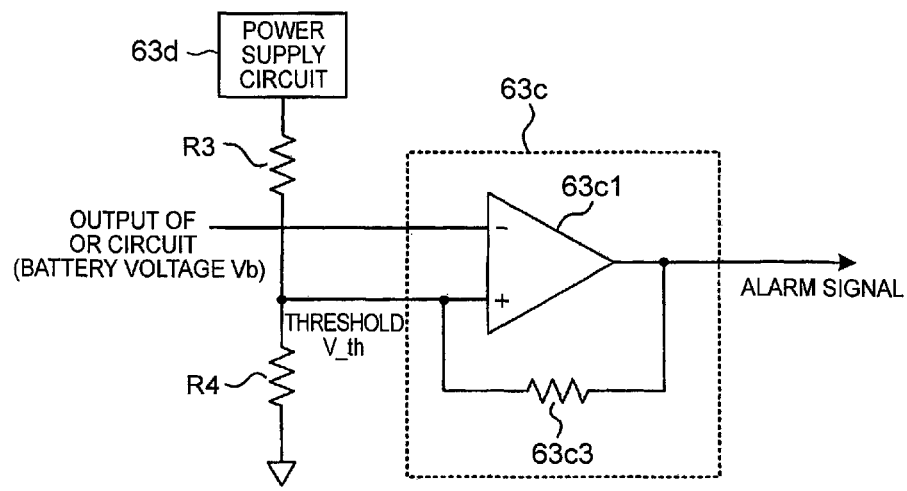
FIG. 12 is a view that shows the configuration of an alarm setting circuit according to the second embodiment.

In the configuration shown in FIG. 11, the alarm signal output from the overcharging detection circuit 63 is input to the photocoupler 65. FIG. 12 shows the configuration of the alarm setting circuit 63c according to the present embodiment.

The positive input terminal of the comparator 63c1 and the output terminal of the comparator 63c1 are connected to each other via a resistor 63c3. That is, the alarm setting circuit 63c is a hysteresis circuit. In the configuration shown in FIG. 12, a value obtained by dividing the output voltage of the comparator 63c1 with the use of the resistors 63c3, R4 becomes a hysteresis. Therefore, by appropriately setting the resistance values of the resistors 63c3, R4, it is possible to adjust the hysteresis.

The threshold V_th input to the comparator 63c1 may be set by dividing the voltage value of the power supply circuit 63d with the use of the resistors R3, R4. Here, the power supply circuit 63d uses electric power of the battery pack 10 (single cells 11). In addition, the voltage value Vb of each single cell 11 is input to the alarm setting circuit 63c. Therefore, when the threshold V_th is set, the voltage value of the battery pack 10 (single cells 11) is easily utilized.

When the voltage value Vb of each single cell 11 is lower than or equal to the threshold (voltage value) V_th, no alarm signal is output from the comparator 63c1. On the other hand, when the voltage value Vb is higher than the threshold V_th, the alarm signal is output from the comparator 63c1. When the alarm signal is output, a hysteresis is generated, and the voltage value input to the positive input terminal of the comparator 63c1 becomes lower than the threshold V_th by the amount of the hysteresis.

Here, after the hysteresis is generated, the voltage value input to the positive input terminal of the comparator 63c1 is set to V_hys. A difference between the threshold V_th and the voltage value V_hys corresponds to the hysteresis.

As described with reference to FIG. 9, when the alarm signal is output from the alarm setting circuit 63c, the charging or discharging operation of the battery pack 10 is stopped, and the polarization of the battery pack 10 is eliminated. With an elimination of the polarization, the voltage value Vb decreases by the voltage variation ΔVb. In the present embodiment, when the alarm signal is output from the comparator 63c1, the voltage value input to the positive input terminal of the comparator 63c1 becomes lower than the threshold V_th.

Therefore, even when the voltage value Vb becomes lower than the threshold V_th with an elimination of the polarization, it is possible to continuously output the alarm signal from the comparator 63c1 by decreasing the threshold V_th by the amount of the hysteresis. Specifically, when the hysteresis is larger than the voltage variation ΔVb, the voltage value Vb does not become lower than the voltage value V_hys, and it is possible to continuously output the alarm signal from the comparator 63c1.

Here, when the voltage variation ΔVb is measured in advance by an experiment, or the like, it is possible to determine the hysteresis in consideration of the measured voltage variation ΔVb. Specifically, it is possible to set the resistance value of the resistor 63c3 such that the hysteresis becomes larger than the voltage variation ΔVb. As described above, the voltage variation ΔVb varies on the basis of the current value flowing through each single cell 11, the resistance value of each single cell 11, and the like.

Therefore, a maximum value that can be taken by the voltage variation ΔVb is specified in advance by an experiment, or the like, and it is possible to set a hysteresis larger than the voltage variation (maximum value) ΔVb. Thus, even when the voltage variation ΔVb changes, it is possible to continuously output the alarm signal from the comparator 63c1.

Figure 13:
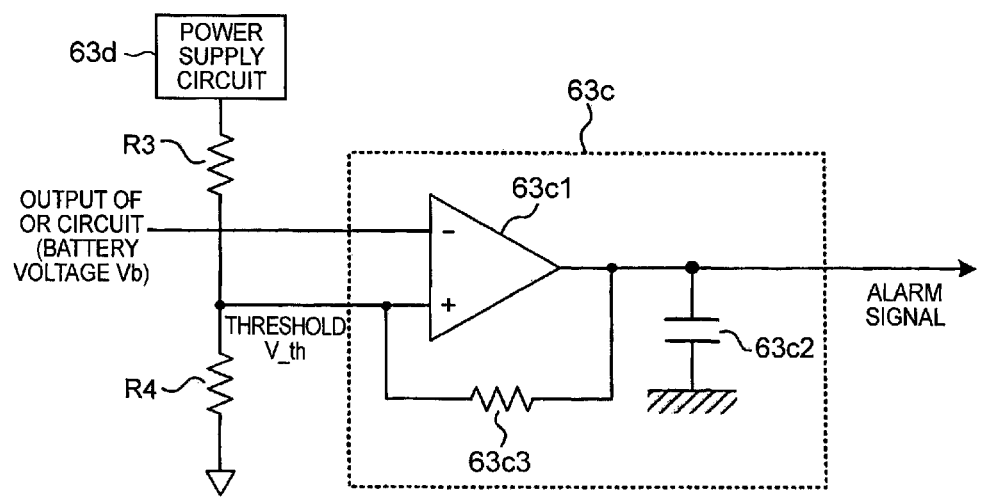
FIG. 13 is a view that shows the configuration of another alarm setting circuit according to the second embodiment.

It is possible to use the configuration shown in FIG. 13 instead of the configuration shown in FIG. 12. The configuration shown in FIG. 12 corresponds to the configuration shown in FIG. 6 described in the first embodiment. The configuration shown in FIG. 13 corresponds to the configuration shown in FIG. 7 described in the first embodiment. In the configuration shown in FIG. 13, the capacitor 63c2 is connected to the output line of the comparator 63c1.

Here, a connection point of the resistor 63c3 with the output line of the comparator 63c1 is located between the output terminal of the comparator 63c1 and a connection point of the capacitor 63c2 with the output line. With the configuration shown in FIG. 13, as well as the configuration shown in FIG. 7, it is possible to reduce noise included in the output signal of the comparator 63c1.

According to the present embodiment, by setting the alarm setting circuit 63c as a hysteresis circuit, it is possible to continuously output the alarm signal. That is, it is possible to impart the function equivalent to the alarm latch circuit 64, described in the first embodiment, to the alarm setting circuit 63c. Thus, by suppressing the behavior of the voltage value Vb, shown in FIG. 9, it is possible to prevent the system main relays SMR-B, SMR-G from repeatedly switching between the on state and the off state. In addition, it is possible to suppress advance of abrasion degradation of the system main relays SMR-B, SMR-G.

In the present embodiment, in comparison with the current interruption circuit 60 described in the first embodiment, it is possible to reduce the size of the current interruption circuit 60 by simplifying the configuration of the current interruption circuit 60 by the amount by which the alarm latch circuit 64 is omitted. In the present embodiment, it is possible to stop outputting the alarm signal by disconnecting the connectors 10a, 60a from each other.

Next, a battery system according to a third embodiment of the invention will be described. In the present embodiment, like reference numerals denote the same elements as those described in the first embodiment, and the detailed description is omitted. Hereinafter, the difference from the first embodiment will be mainly described.

In the first embodiment, by disconnecting the connectors 10a, 60a from each other, supply of electric power from the power supply circuit 63d to the alarm latch circuit 64 is interrupted, and outputting the alarm signal from the alarm latch circuit 64 is stopped. In the present embodiment, even when the connectors 10a, 60a are not disconnected from each other, outputting the alarm signal from the alarm latch circuit 64 is stopped. In other words, in the present embodiment, even when the connectors 10a, 60a are not disconnected from each other, supply of electric power from the power supply circuit 63d to the alarm latch circuit 64 is interrupted.

Figure 14:
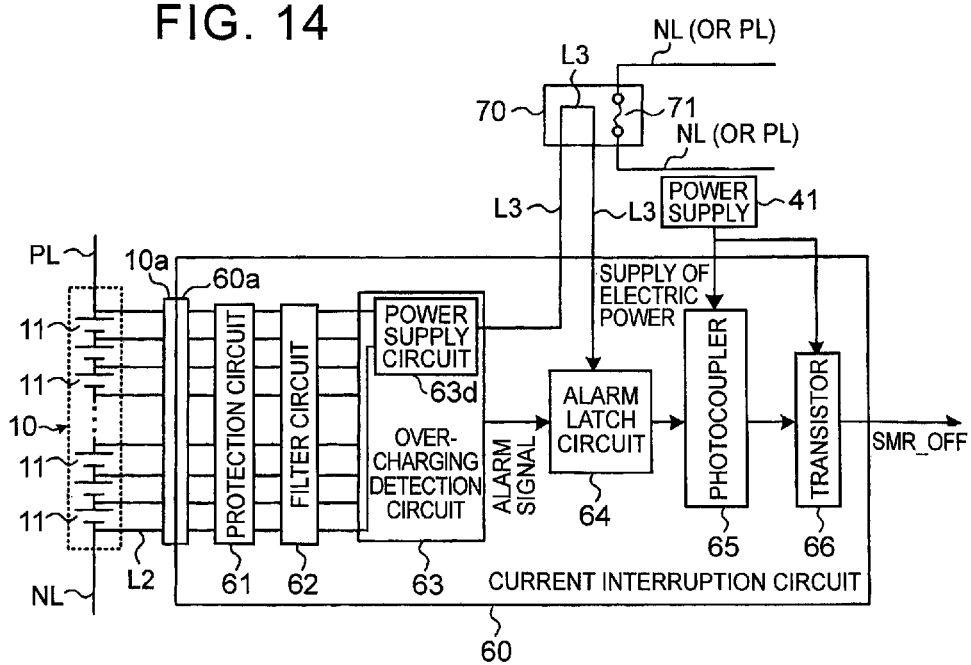
FIG. 14 is a view that shows the configuration of a current interruption circuit according to a third embodiment.

FIG. 14 shows the configuration of part of the battery system according to the present embodiment. Electric power generated by the power supply circuit 63d included in the overcharging detection circuit 63 is supplied to the alarm latch circuit 64 via a power supply line L3. Here, the power supply line L3 extends to a plug 70 provided outside the current interruption circuit 60. The plug 70 is used to interrupt energization of the battery pack 10.

In the present embodiment, a fuse 71 is provided in the plug 70. The fuse 71 is provided in the negative electrode line NL or the positive electrode line PL, and is used to prevent excessive current from flowing through the battery pack 10. That is, when excessive current flows through the battery pack 10, it is possible to interrupt energization of the battery pack 10 through melting of the fuse 71. The fuse 71 may be omitted.

FIG. 14 shows a state where the plug 70 is connected at a predetermined location. In the state shown in FIG. 14, current is allowed to be supplied to the battery pack 10. That is, the negative electrode line NL or the positive electrode line PL is in a conductive state via the fuse 71 included in the plug 70, and it is possible to charge or discharge the battery pack 10 when the system main relays SMR-B, SMR-G are in the on state.

Figure 15:
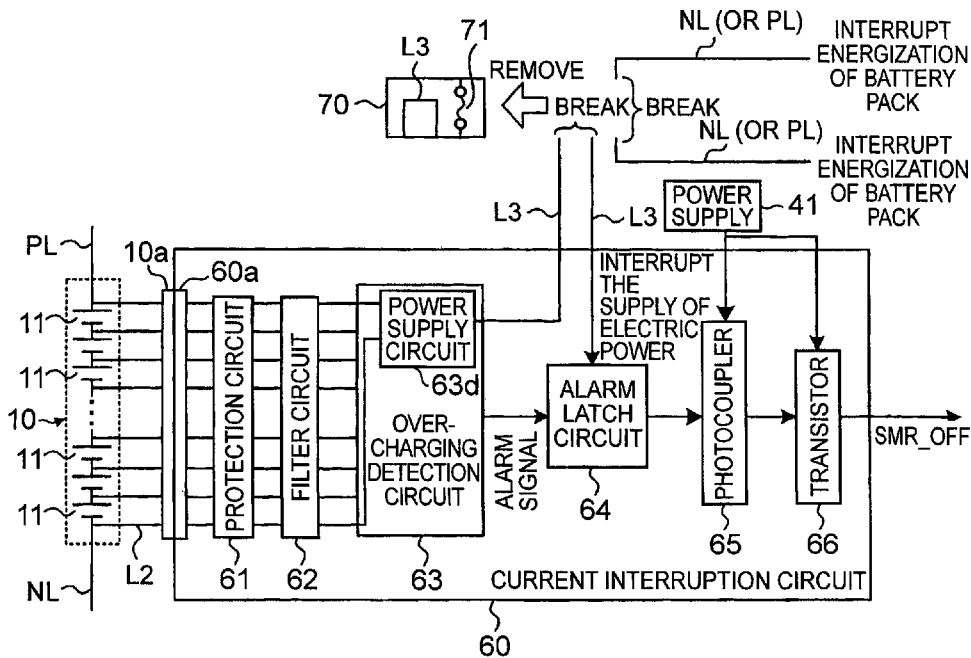
FIG. 15 is a view that shows the configuration of the current interruption circuit according to the third embodiment.

The plug 70 may be removed from the predetermined location. By removing the plug 70, it is possible to change from the state shown in FIG. 14 to the state shown in FIG. 15. That is, by removing the plug 70, it is possible to break the negative electrode line NL or the positive electrode line PL. By breaking the negative electrode line NL or the positive electrode line PL, it is possible to interrupt energization of the battery pack 10.

When the plug 70 is connected to the predetermined location again, it is possible to set the negative electrode line NL or the positive electrode line PL in the conductive state. That is, current is allowed to be supplied to the battery pack 10. Here, for example, when the battery system is checked, the plug 70 may be removed.

The power supply line L3 extends through the plug 70, and it is also possible to break the power supply line L3 by removing the plug 70. By breaking the power supply line L3, supply of electric power from the power supply circuit 63d to the alarm latch circuit 64 is interrupted. Thus, as described in the first embodiment, it is possible to stop outputting the alarm signal from the alarm latch circuit 64. When the plug 70 is connected to the predetermined location again, it is possible to set the power supply line L3 in the conductive state, and it is possible to supply electric power of the power supply circuit 63d to the alarm latch circuit 64.

According to the present embodiment, without disconnecting the connectors 10a, 60a from each other, it is possible to stop outputting the alarm signal from the alarm latch circuit 64. Here, when the alarm signal is being output from the alarm latch circuit 64, it is required to check the battery system. In addition, when the battery system is checked, it is desirable to cancel the alarm signal retained by the alarm latch circuit 64.

When the battery system is checked, the plug 70 is removed. Therefore, as a result of removal of the plug 70, it is possible to cancel the alarm signal retained by the alarm latch circuit 64. In the configuration that the retained alarm signal is cancelled by disconnecting the connectors 10a, 60a from each other, not only work for removing the plug 70 but also work for disconnecting the connectors 10a, 60a from each other should be performed. In the present embodiment, it is possible to cancel the retained alarm signal only by removing the plug 70, so it is possible to improve workability at the time of checking the battery system.

In the present embodiment, the plug 70 is provided in the negative electrode line NL or the positive electrode line PL; however, the invention is not limited to this configuration. Specifically, the plug 70 may be provided between the two single cells 11 electrically connected in series with each other. In other words, the plug 70 may be provided in a path through which current is supplied to the battery pack 10. In this case as well, it is possible to interrupt energization of the battery pack 10 by removing the plug 70 or allow energization of the battery pack 10 by connecting the plug 70.

Next, a battery system according to a fourth embodiment of the invention will be described. In the present embodiment, like reference numerals denote the same elements as those described in the first embodiment, and the detailed description is omitted. Hereinafter, the difference from the first embodiment will be mainly described.

Figure 16:
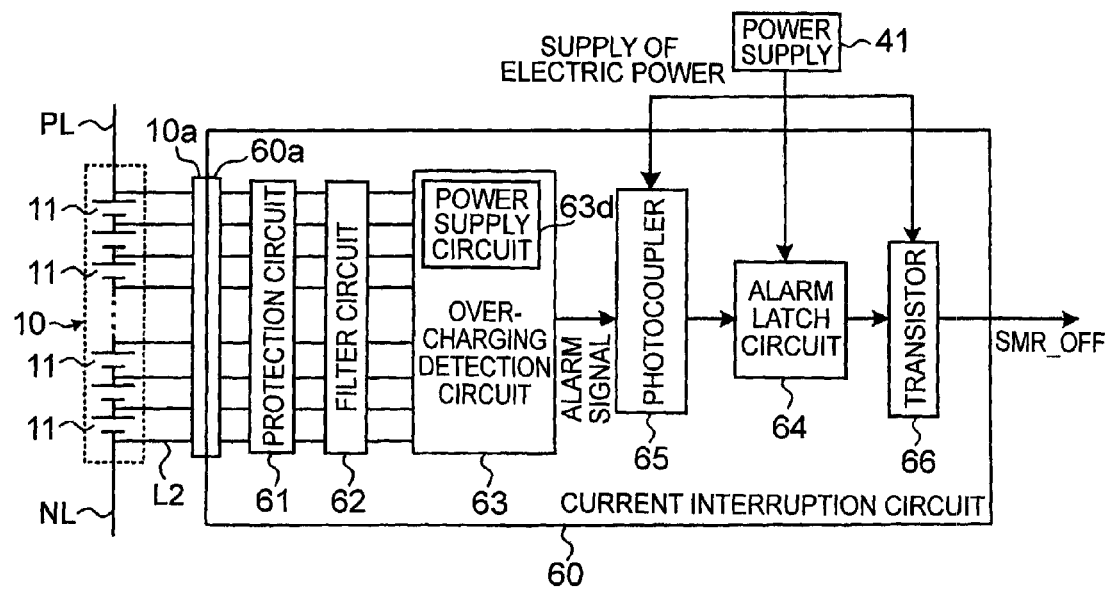
FIG. 16 is a view that shows the configuration of a current interruption circuit according to a fourth embodiment.

In the first embodiment, the alarm latch circuit 64 is connected to the overcharging detection circuit 63, and the alarm signal output from the overcharging detection circuit 63 is input to the alarm latch circuit 64. In the present embodiment, as shown in FIG. 16, in the configuration of the current interruption circuit 60 described in the first embodiment, the location at which the alarm latch circuit 64 is provided is changed. Hereinafter, description will be specifically made.

The photocoupler 65 is connected to the overcharging detection circuit 63, and the alarm signal output from the overcharging detection circuit 63 is input to the photocoupler 65. When the alarm signal is input to the photocoupler 65, the photocoupler 65 switches from the off state to the on state. The alarm latch circuit 64 is connected to the photocoupler 65, and the output signal (on signal) of the photocoupler 65 is input to the alarm latch circuit 64. Here, the on signal of, the photocoupler 65 corresponds to the alarm signal.

When the output signal of the photocoupler 65 is input to the alarm latch circuit 64, the alarm latch circuit 64 retains the input signal from the photocoupler 65. The alarm latch circuit 64 having a similar configuration to the configuration described in the first embodiment may be used. The transistor 66 is connected to the alarm latch circuit 64, and interrupts energization of the exciting coils 51 of the system main relays SMR-B, SMR-G, SMR-P upon reception of the output signal of the alarm latch circuit 64.

In the present embodiment as well, as in the case of the first embodiment, when the alarm signal is output from the overcharging detection circuit 63, the alarm latch circuit 64 retains this state, and energization of the exciting coils 51 is continuously interrupted via the transistor 66. Here, the alarm latch circuit 64 is included in a circuit (low voltage circuit) located at the output side of the photocoupler 65. Therefore, not electric power from the power supply circuit 63d but electric power from the power supply 41 is supplied to the alarm latch circuit 64.

In the configuration shown in FIG. 16, it is conceivable to supply electric power of the power supply circuit 63d to the alarm latch circuit 64; however, in this case, it is required to convert the voltage of the power supply circuit 63d to a low voltage. That is, an insulating element, such as a photocoupler, needs to be arranged in the power supply line that connects the power supply circuit 63d to the alarm latch circuit 64. In this case, the number of components increases by the amount by which the insulating element is provided. In the present embodiment, it is just required to connect the power supply 41 to the alarm latch circuit 64, so it is possible to suppress an increase in the number of components.

In the present embodiment, supply of electric power from the power supply 41 is interrupted in response to switching of the ignition switch from the on state to the off state. That is, the relay for connecting the power supply 41 to the electric components switches from the on state to the off state in response to switching of the ignition switch from the on state to the off state. Therefore, when the ignition switch switches from the on state to the off state, electric power of the power supply 41 stops being supplied to the alarm latch circuit 64, the photocoupler 65 and the transistor 66.

Thus, as in the case of the first embodiment, it is possible to cancel the alarm signal retained by the alarm latch circuit 64. In the present embodiment, even when the connectors 10a, 60a are not disconnected from each other, it is possible to interrupt supply of electric power from the power supply circuit 63d to the alarm latch circuit 64 and then to cancel the alarm signal retained by the alarm latch circuit 64 only by switching the ignition switch from the on state to the off state.

On the other hand, when the ignition switch switches from the off state to the on state, supply of electric power from the power supply 41 to the alarm latch circuit 64 is resumed. Here, when no alarm signal is output from the overcharging detection circuit 63, it is possible to charge or discharge the battery pack 10 by causing the system main relays SMR-B, SMR-G to switch from the off state to the on state.

Particularly, it is possible to continuously cause the vehicle to travel by allowing the discharging operation of the battery pack 10. For example, even after any one of the single cells 11 becomes the overcharged state and then the current interruption circuit 60 causes the system main relays SMR-B, SMR-G, SMR-P to turn off, it is possible to set the battery system in the start-up state (ready-on state) by turning on the ignition switch again according to the present embodiment. Thus, even after any one of the single cells 11 becomes the overcharged state, it is possible to cause the vehicle to travel in order to cause the vehicle to retreat to a specified place.

The process of cancelling the alarm signal retained by the alarm latch circuit 64 is conceivably executed in response to a command of the battery ECU 30. Here, when the battery ECU 30 has a failure, it may not be possible to cancel the retained alarm signal. In the present embodiment, electric power of the power supply 41 is directly supplied to the alarm latch circuit 64, so there is no influence due to the failure of the battery ECU 30. That is, even when the battery ECU 30 has a failure, it is possible to cancel the retained alarm signal by turning off the ignition switch.

Next, a battery system according to a fifth embodiment of the invention will be described. In the present embodiment, like reference numerals denote the same elements as those described in the first and fourth embodiments, and the detailed description is omitted. Hereinafter, the difference from the first and fourth embodiments will be mainly described.

Figure 17:
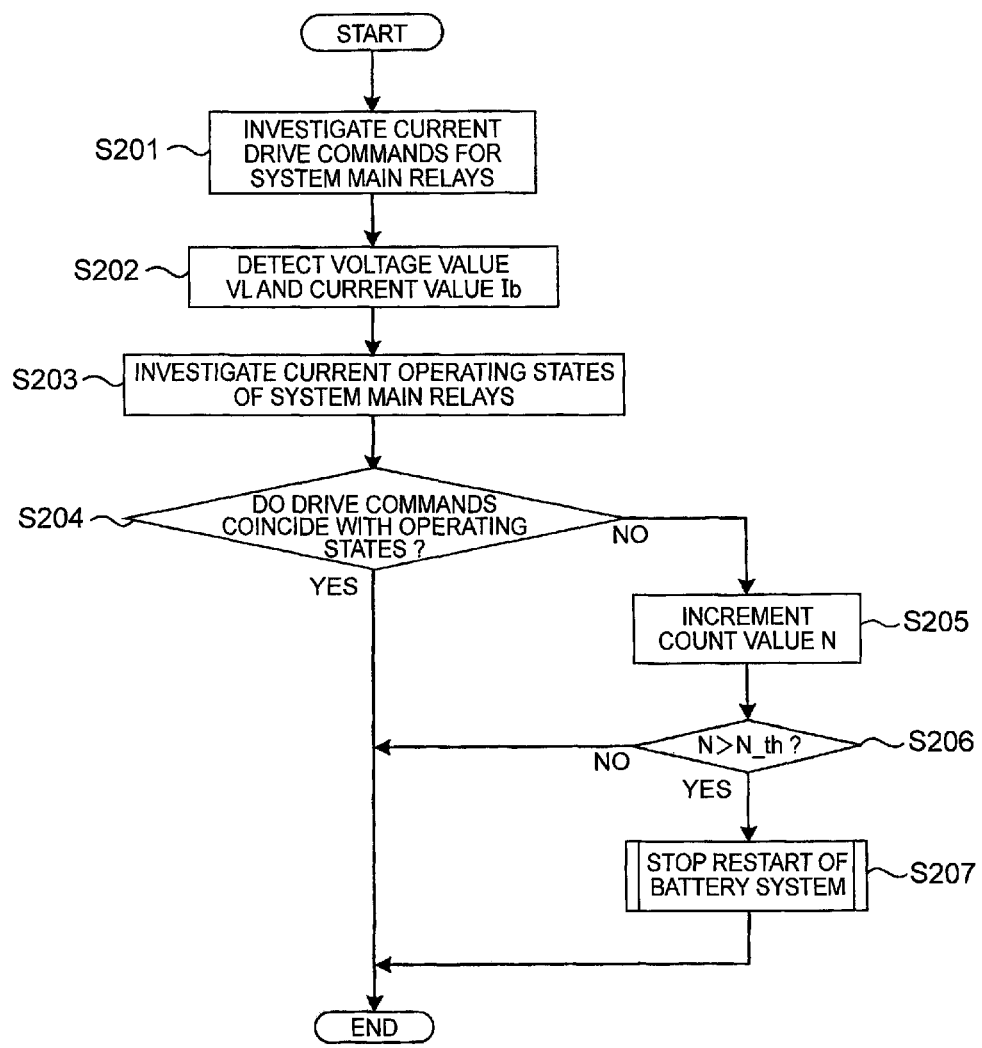
FIG. 17 is a flowchart that shows the process of controlling a restart of a battery system according to a fifth embodiment.

FIG. 17 is a flowchart that shows (part of) the operation of the battery system according to the present embodiment. The process shown in FIG. 17 is executed by the host ECU 34.

In step S201, the host ECU 34 investigates current drive commands for the system main relays SMR-B, SMR-G, SMR-P. When the drive commands for the system main relays SMR-B, SMR-G, SMR-P are output, the host ECU 34 is able to store information about the drive commands in the memory. Thus, the host ECU 34 is able to investigate the current drive commands on the basis of the information stored in the memory.

In step S202, the host ECU 34 acquires the voltage value VL on the basis of the output of the voltage sensor 24. In addition, the host ECU 34 acquires the current value Ib of the battery pack 10 on the basis of the output of the current sensor 21. When the battery pack 10 is connected to the load (inverter 22), the voltage value VL indicates the voltage value of the battery pack 10, and the current value Ib indicates a value based on the charging or discharging operation of the battery pack 10. On the other hand, when the battery pack 10 is not connected to the load (inverter 22), the voltage value VL is 0 [V], and the current value Ib is 0 [A].

In step S203, the host ECU 34 investigates the current operating states of the system main relays SMR-B, SMR-G, SMR-P on the basis of the voltage value VL and the current value Ib acquired in the process of step S202. As described above, when the voltage value VL is higher than 0 [V] and the current value Ib is not 0 [A], the battery pack 10 is connected to the load (inverter 22). At this time, the host ECU 34 is allowed to determine that the system main relays SMR-B, SMR-G are in the on state.

On the other hand, when the voltage value VL is 0 [V] and the current value Ib is 0 [A], the battery pack 10 is not connected to the load (inverter 22). At this time, the host ECU 34 is allowed to determine that at least one of the system main relays SMR-B, SMR-G is in the off state.

Here, when it is determined whether the battery pack 10 is connected to the load (inverter 22), it is possible to take the detection errors, and the like, of the voltage sensor 24 and current sensor 21 into consideration. Specifically, a value higher than 0 [V] is set as a threshold (voltage value) V_min, and, when the voltage value VL is higher than or equal to the threshold V_min, the host ECU 34 is allowed to determine that the battery pack 10 is connected to the load (inverter 22). In addition, when the voltage value VL is lower than the threshold V_min, the host ECU 34 is allowed to determine that the battery pack 10 is not connected to the load (inverter 22).

On the other hand, a value (positive value) different from 0 [A] is set as a threshold (current value) Ib_min, and, when the absolute value of the current value Ib is larger than or equal to the threshold Ib_min, the host ECU 34 is allowed to determine that the battery pack 10 is connected to the load (inverter 22). In addition, when the absolute value of the current value Ib is smaller than the threshold Ib_min, the host ECU 34 is allowed to determine that the battery pack 10 is not connected to the load (inverter 22).

In the present embodiment, the current value Ib becomes a positive value at the time when the battery pack 10 is discharged, and the current value Ib becomes a negative value at the time when the battery pack 10 is charged. Therefore, when the current value Ib is compared with the threshold Ib_min, the absolute value of the current value Ib should be compared with the threshold Ib_min.

In the present embodiment, the connection state between the battery pack 10 and the load (inverter 22), in other words, the operating states of the system main relays SMR-B, SMR-G, SMR-P, are investigated on the basis of the voltage value VL and the current value Ib; however, the invention is not limited to this configuration. Specifically, it is possible to investigate the operating states of the system main relays SMR-B, SMR-G, SMR-P on the basis of only one of the voltage value VL and the current value Ib.

In step S204, the host ECU 34 compares the drive commands investigated in the process of step S201 with the operating states investigated in the process of step S203. For example, in the process of step S201, the host ECU 34 determines that the drive commands for causing the system main relays SMR-B, SMR-G to turn on are issued. In addition, in the process of step S203, the host ECU 34 determines that the system main relays SMR-B, SMR-G are in the on state. In this case, the host ECU 34 determines that the drive commands coincide with the operating states.

On the other hand, in the process of step S201, the host ECU 34 determines that the drive commands for causing the system main relays SMR-B, SMR-G to turn on are issued. In addition, in the process of step S203, the host ECU 34 determines that at least one of the system main relays SMR-B, SMR-G is in the off state. In this case, the host ECU 34 determines that the drive commands do not coincide with the operating states.

In step S204, when the drive commands do not coincide with the operating states, the host ECU 34 executes the process of step S205. Here, when the drive commands do not coincide with the operating states, the host ECU 34 is allowed to determine that the current interruption circuit 60 is operated. On the other hand, when the drive commands coincide with the operating states, the host ECU 34 ends the process shown in FIG. 17. Here, when the drive commands coincide with the operating states, the host ECU 34 is allowed to determine that the current interruption circuit 60 is not operated.

In step S205, the host ECU 34 increments a count value N set by a counter. The counter may be provided in the host ECU 34. In the present embodiment, each time the host ECU 34 determines that the drive commands do not coincide with the operating states, the count value N increases.

In step S206, the host ECU 34 determines whether the count value N obtained in the process of step S205 is larger than a threshold N_th. The threshold N_th is a positive integer, and may be set as needed. In addition, information about the threshold N_th may be stored in the memory. When the count value N is larger than the threshold N_th, the host ECU 34 executes the process of step S207. On the other hand, when the count value N is smaller than or equal to the threshold N_th, the host ECU 34 ends the process shown in FIG. 17.

In step S207, the host ECU 34 executes the process of stopping a restart of the battery system. That is, even when the ignition switch switches from the off state to the on state, the host ECU 34 does not cause the system main relays SMR-B, SMR-G, SMR-P to switch from the off state to the on state, and causes the battery system not to switch from the stopped state (ready-off state) to the start-up state (ready-on state). When the process of step S207 is executed, the host ECU 34 should set a flag for not allowing a restart of the battery system. The host ECU 34 is able to determine whether it is allowed to start up the battery system by investigating the flag.

In the configuration that electric power of the power supply 41 is directly supplied to the alarm latch circuit 64, electric power is supplied from the power supply 41 to the alarm latch circuit 64 each time the ignition switch switches from the off state to the on state. As described in the fourth embodiment, unless the alarm signal is output from the overcharging detection circuit 63, it is possible to charge or discharge the battery pack 10 by causing the system main relays SMR-B, SMR-G to switch from the off state to the on state.

Here, when the charging or discharging operation of the battery pack 10 is allowed, it is possible to continuously cause the vehicle to travel. If any one of the single cells 11 becomes the overcharged state while the vehicle is traveling, the alarm signal is output from the overcharging detection circuit 63, so the system main relays SMR-B, SMR-G, SMR-P turn off. After the battery system enters the stopped state (ready-off state), when the ignition switch is turned on again, it is possible to continuously cause the vehicle to travel by allowing the charging or discharging operation of the battery pack 10 as described above.

In this way, when the battery system repeatedly switches between the start-up state (ready-on state) and the stopped state (ready-off state) on the basis of the overcharged state of any one of the single cells 11, a user, or the like, may experience a feeling of strangeness. In addition, the system main relays SMR-B, SMR-G, SMR-P repeatedly switch between the on state and the off state, so abrasion degradation of the system main relays SMR-B, SMR-G, SMR-P is advanced. Furthermore, in a situation that each single cell 11 tends to become the overcharged state, by repeatedly setting the battery system in the start-up state (ready-on state), it is easy to advance a decrease in the service life of the battery pack 10 (single cells 11).

In the present embodiment, as described above, the drive commands and operating states of the system main relays SMR-B, SMR-G, SMR-P are investigated, and the number of times (count value N) the current interruption circuit 60 is operated is acquired. When the number of times the current interruption circuit 60 is operated, in other words, when the count value N is larger than the threshold N_th, the battery system is not set in the start-up state (ready-on state) again. By not allowing a start-up of the battery system, it is possible to avoid the above-described inconvenience. Here, the threshold (N_th) used to execute the process of step S206 may be set as needed in consideration of the above-described inconvenience.

The invention claimed is:

1. An electrical storage system comprising:
    an electrical storage device in which a plurality of electrical storage blocks configured to be charged or discharged are connected in series with each other;
    a relay configured to switch between an on state where the electrical storage device is connected to a load and an off state where connection of the electrical storage device with the load is interrupted;
    a controller configured to control an on-off state of the relay; and
    a current interruption circuit configured to interrupt energization of the electrical storage device by causing the relay to switch from the on state to the off state,
    the current interruption circuit including
    an alarm circuit configured to output an alarm signal indicating that any one of the electrical storage blocks is in an overcharged state by comparing a voltage value of each of the electrical storage blocks with a threshold;
    a latch circuit configured to retain the alarm signal;
    a transistor configured to cause the relay to switch from the on state to the off state upon reception of an output signal of the latch circuit;
    a power supply circuit configured to generate electric power for operating the latch circuit using electric power of the electrical storage device; and
    a plug configured to be movable between a first position in which energization of the electrical storage device is allowed and a second position in which energization of the electrical storage device is interrupted in response to a user's operation, the plug being configured to interrupt a line, through which electric power of the power supply circuit is supplied to the latch circuit, by being moved to the second position.

2. The electrical storage system according to claim 1, wherein
    the alarm circuit includes
    a first comparator configured to detect a voltage value of a corresponding one of the electrical storage blocks; and
    a second comparator configured to output the alarm signal when the voltage value detected by any one of the first comparators is higher than the threshold.

3. An electrical storage system comprising:
    an electrical storage device in which a plurality of electrical storage blocks configured to be charged or discharged are connected in series with each other;
    a relay configured to switch between an on state where the electrical storage device is connected to a load and an off state where connection of the electrical storage device with the load is interrupted;
    a controller configured to control an on-off state of the relay; and
    a current interruption circuit configured to interrupt energization of the electrical storage device by causing the relay to switch from the on state to the off state,
    the current interruption circuit including
    an alarm circuit configured to output an alarm signal indicating that any one of the electrical storage blocks is in an overcharged state by comparing a voltage value of each of the electrical storage blocks with a threshold;
    a latch circuit configured to retain the alarm signal;
    a photocoupler configured to generate an input signal of the latch circuit upon reception of an output signal of the alarm circuit; and
    a transistor configured to cause the relay to switch from the on state to the off state upon reception of an output signal of the latch circuit, and
    the latch circuit being configured to operate upon reception of electric power supplied from a power supply configured to supply electric power to the photocoupler and the transistor, wherein
    the electrical storage device is mounted on a vehicle, the electrical storage device being configured to output energy used to cause the vehicle to travel, supply of electric power from the power supply to the electrical storage device being interrupted in response to switching of an ignition switch of the vehicle from an on state to an off state.

4. The electrical storage system according to claim 3, wherein
the controller is configured to determine that the current interruption circuit is in an operated state when a drive command for the relay does not coincide with an operating state of the relay, and not to connect the electrical storage device to the load when the number of times the current interruption circuit is operated is larger than a predetermined number of times.

5. The electrical storage system according to claim 4, wherein
the controller is configured to determine the operating state of the relay with the use of at least one of a voltage sensor configured to detect a voltage value of the electrical storage device and a current sensor configured to detect a current value of the electrical storage device.

6. The electrical storage system according to claim 3, wherein the latch circuit is configured to cancel the retained alarm signal in response to interruption of supply of electric power from the power supply.

7. The electrical storage system according to claim 1, wherein the latch circuit is configured to cancel the retained alarm signal in response to interruption of supply of electric power from the power supply.

* * * * *